United States Patent [19]

Kennedy et al.

[11] Patent Number: 5,856,392
[45] Date of Patent: *Jan. 5, 1999

[54] HIGHER ORDER STAR POLYMERS HAVING MULTIPLE POLYISOBUTYLENE ARMS RADIATING FROM A CONDENSED CORE OF SILOXANES AND A METHOD FOR THE SYNTHESIS THEREOF

[75] Inventors: Joseph P. Kennedy, Akron, Ohio; Naoki Omura, Isobe Annaka Gunma, Japan; Alexander Lubnin, Fairlawn, Ohio

[73] Assignee: The University of Akron, Akron, Ohio

[*] Notice: The term of this patent shall not extend beyond the expiration date of Pat. No. 5,663,245.

[21] Appl. No.: 861,395

[22] Filed: May 21, 1997

Related U.S. Application Data

[63] Continuation-in-part of Ser. No. 620,421, Mar. 22, 1996, Pat. No. 5,663,245.

[51] Int. Cl.$^6$ ..................................................... C08G 77/12
[52] U.S. Cl. ............................. 525/479; 525/106; 528/13; 528/15; 528/32
[58] Field of Search ..................................... 525/479, 106; 528/15, 13, 32

[56] References Cited

U.S. PATENT DOCUMENTS

| | | | |
|---|---|---|---|
| 3,691,257 | 9/1972 | Kendrick et al. | 260/827 |
| 4,386,135 | 5/1983 | Campbell et al. | 428/447 |
| 4,675,365 | 6/1987 | Lin et al. | |
| 5,036,139 | 7/1991 | Spinelli | 525/326.5 |
| 5,057,576 | 10/1991 | Spinelli | 525/267 |
| 5,276,095 | 1/1994 | Hoxmeier | 525/105 |
| 5,281,666 | 1/1994 | Hoxmeier | 525/105 |
| 5,378,790 | 1/1995 | Michalczyk et al. | 528/35 |
| 5,395,885 | 3/1995 | Kennedy et al. | 525/98 |
| 5,451,637 | 9/1995 | Leibfried | 525/105 |

*Primary Examiner*—Patricia A. Short
*Attorney, Agent, or Firm*—Renner, Kenner, Greive, Bobak, Taylor & Weber

[57] ABSTRACT

The synthesis and characterization of novel higher order, multi-arm star polymers comprising polyisobutylene arms connected to condensed cyclosiloxane cores are described. The synthesis has been achieved by hydrosilating olefin-capped (e.g., allyl- or isopropenyl-terminated) polyisobutylene with hydrogencyclosiloxanes carrying a plurality of Si—H groups and simultaneously and competitively converting SiH functions, in the presence of moisture, to Si—OH groups to rapidly self-condense or react with SiH groups to form coupled cyclosiloxane cores via core-core coupling. Thus, higher order stars having many more arms than first order stars can be formed.

16 Claims, 7 Drawing Sheets

5,856,392

HIGHER ORDER STAR POLYMERS HAVING MULTIPLE POLYISOBUTYLENE ARMS RADIATING FROM A CONDENSED CORE OF SILOXANES AND A METHOD FOR THE SYNTHESIS THEREOF

CROSS-REFERENCE TO RELATED APPLICATIONS

This application is a continuation-in-part of U.S. application Ser. No. 08/620,421, filed May 22, 1996, now U.S. Pat. No. 5,663,245.

The research disclosed in this application was at least partially supported by the National Science Foundation under Grant 94-23202.

TECHNICAL FIELD

This invention relates generally to star polymers. More particularly, this invention relates to higher order star polymers having multiple, well-defined arms of polyisobutylene emanating from a condensed core of siloxanes, and preferably, cyclosiloxanes. The synthesis of these higher order stars is undertaken by linking allyl-terminated polyisobutylene arms (PIB—CC=C) with multi-functional (i.e., SiH groups) hydrogen cyclosiloxanes such as methylcyclosiloxanes ($D_n^H$) via hydrosilation to form first-order stars and providing moisture to convert at least some of the SiH groups to SiOH groups, thereby obtaining core-core couplings of the cyclosiloxanes. The processes (i.e., hydrosilation and core-core coupling) have been found to proceed simultaneously and competitively at various rates until the reactive functions (e.g., PIB—CC=C, SiH, SiOH) are consumed or become inactive due to steric hinderance, and, thus, form higher order stars comprising many arms of polyisobutylene emanating from a complex core of condensed cyclosiloxanes.

BACKGROUND OF THE INVENTION

The synthesis of various multi-arm star polymers has long been of growing practical and theoretical interest to a variety of industries. Such star polymers have shown to be useful as, inter alia, surfactants, lubricants, rheology modifiers, and viscosity modifiers. In fact, star polymers are now considered by many to be state-of-the-art viscosity modifiers and oil additives, although the potential of many of these star polymers for these applications is still being evaluated and tested.

One well-known representative of this class of materials currently being used as an oil additive is commercially available from the Shell Oil Co. (Houston, Tex.) under the tradename Shelvis. This oil additive is a multi-arm star molecule consisting of many hydrogenated polyisoprene arms emanating from an ill-defined, single core of crosslinked polydivinylbenzene (PDVB). By the term "ill-defined" it is meant that the core of the star polymer, e.g., PDVB, is an uncontrolled, crosslinked, gel-like structure having unsaturation sites in the core. In comparison, "well-defined" cores are built of readily characterizable, soluble molecules which are precursors to the core. As a result, the structure of the resultant star polymers having well-defined cores can be controlled.

Also, it is believed that the resultant star polymers having well-defined cores may impart better shear stability than star polymers using ill-defined cores. That is, the presence of unsaturation sites (i.e., double bonds) in the ill-defined cores (PDVB) provides for the possibility that the resultant star polymers will be less shear stable and more sensitive to oxidative reactions than the star polymers having well-defined cores. Thus, in engine oil where shear stability is of critical importance, the possibility exists that during high temperature use and heavy shear in the engine, the ill-defined cores will degrade.

Similarly, the polyisoprene arms in the Shelvis product may contain some unsaturation which is also undesirable. Like the core, the presence of double bonds in the arms may cause them to decompose as well during high temperature and heavy shear conditions within the engine.

Recently, there has been a growing interest in star polymers consisting of multiple polyisobutylene (PIB) arms. For example, Kennedy et al. U.S. Pat. No. 5,395,885 describes the synthesis of star polymers having multiple PIB arms and PDVB cores using cationic synthesis techniques. Because the structure of polyisobutylene is readily characterized and contains no unsaturation, these PIB-based stars are suspected to be useful for a variety of applications such as motor oil additives and viscosity index improvers. However, their potential is still being evaluated and tested, and in motor oil additives where shear stability is of critical importance, the possibility remains that, because of the use of ill-defined, crosslinked aromatic cores such as PDVB, the PIB-PDVB stars currently being tested may not be highly desirable for such use.

On the other hand, studies have demonstrated that silicone oils apparently have superior shear stability properties as compared to hydrocarbon oils. For example, Fitzsimmons et al., in *Trans. ASME*, 68, 361 (1946), have shown that the viscosity of a silicone oil decreased less than 2 percent after 105,000 cycles, whereas the viscosity of a hydrocarbon oil dropped by more than 50 percent after only 18,000 cycles under certain operating conditions in an aircraft gear pump. Thus, it is seen as highly desirable to provide a star polymer having multiple well-defined polyisobutylene arms and a well-defined, silicone-based core which polymer would be shear-stable.

To that end, attempts have been made to provide such potentially useful star polymers. In pending U.S. application Ser. No. 08/620,421 (allowed), the inventors of record demonstrated the first synthesis of well-defined, first order stars having multiple arms of polyisobutylene emanating from a cyclosiloxane core. These first order stars were formed by hydrosilation of, inter alia, ω-allyl-terminated polyisobutylene (PIB—CC=C) with methylcyclosiloxanes carrying 4 to 8 SiH groups ($D_n^H$, where n=4 to 8).

By the term "first order" it is meant that these star polymers are essentially being synthesized by linking, via hydrosilation, a number of olefin-terminated polyisobutylene prearms to SiH groups of a single cyclosiloxane molecule. In theory, the number of arms emanating from this molecule would total the number of SiH groups on the siloxane molecule. Thus, theoretically, for a hexamethylcyclosiloxane molecule ($D_6^H$) which has six SiH groups, a maximum of six polyisobutylene arms would radiate from the molecule.

In contrast, "higher order" star polymers have the potential for many more SiH groups for linking olefin-terminated polyisobutylene prearms to the core. While the number of arms emanating from the core cannot total more than the number of SiH groups originally available, the core in higher order star polymers is capable of having many times more SiH groups than are present on any one individual cyclosiloxane molecule. This is true because of the character of the core component in higher order stars which includes a plurality of individual cyclosiloxane molecules coupled together. Since only one reactive site is needed to couple two cyclosiloxanes, it will be appreciated that the number of SiH groups capable of linking polyisobutylene prearms to the core of the higher order star increases significantly where there are more SiH groups present. In other words, higher order stars might be envisioned as clusters of first-order star polymers linked together by their siloxane cores.

In the course of investigating the multi PIB-arm/ cyclosiloxane core first order star polymers using $D_6^H$, it was observed that, in the presence of trace amounts of water in the hydrosilation charges, a small number of stars were observed which had a higher number of arms than the expected six. The formation of these "second-order" stars was explained by random core-core coupling, a process which has since been corroborated by direct experiments.

Since the number of common methylcyclosiloxanes with multiple SiH functions is quite limited (only two such cyclosiloxanes are commercially available, $D_4^H$ and $D_5^H$), the designed preparation of "higher-order" multi-arm stars by hydrosilation of allyl-terminated PIB by a specific methylcyclosiloxane appeared to be cumbersome. Moreover, and potentially more detrimental, it was determined that steric compression severely limits the quantitative hydrosilation of multiple neighboring SiH groups. Thus, while the production of higher order stars by the random core-core couplings of a few multi-functional hydrogen cyclosiloxanes—that is, stars of two molecules of cyclosiloxane coupled together— was apparent from prior work, the controlled synthesis of stars of even higher orders, i.e., stars having three or more siloxanes coupled together, have heretofore been unknown.

SUMMARY OF INVENTION

It is, therefore, an object of the present invention to provide a higher order star polymer having a plurality of polyisobutylene arms connected to a core of condensed siloxanes.

It is another object of the present invention to provide a higher order star polymer, as above, which may be shear-stable and acid-base stable.

It is yet another object of the present invention to provide a higher order star polymer, as above, wherein the total number of polyisobutylene arms are greater than the number of SiH groups present on any one individual siloxane.

It is still another object of the present invention to provide a higher order star polymer, as above, which includes at least one SiOH group.

It is a further object of the present invention to provide a method for synthesizing a higher order star polymer having a condensed core of at least two siloxanes.

It is yet a further object of the present invention to provide a method for synthesizing a higher order star polymer, as above, via controlled core-core coupling.

At least one or more of the foregoing objects, and possibly other aspects of the invention which will become apparent as the detailed description proceeds, are achieved by a star polymer comprising a core component including at least three siloxanes containing at least two SiH groups and at least one SiOH groups, and a plurality of polyisobutylene arms attached to the core component, wherein the total number of polyisobutylene arms is greater than the number of SiH groups present on any one siloxane.

Other objects or aspects of the invention which will become apparent herein are attained by a method for synthesizing a star polymer containing a condensed core of at least two siloxanes, preferably cyclosiloxanes, and a plurality of olefin-terminated polyisobutylene arms emanating from the core. The method includes the steps of linking the olefin-terminated polyisobutylene arms to one of the siloxanes by hydrosilation and providing a sufficient amount of water to produce at least one SiOH group with the core. That is, a sufficient amount of water should be provided such that some fraction of the available SiH groups in the core is converted to SiOH groups.

BRIEF DESCRIPTION OF THE DRAWINGS

For a complete understanding of the objects, techniques and structure of the invention, reference should be made to the following detailed description of a preferred embodiment and the accompanying drawings wherein.

PREFERRED EMBODIMENT FOR CARRYING OUT THE INVENTION

Figure 1:
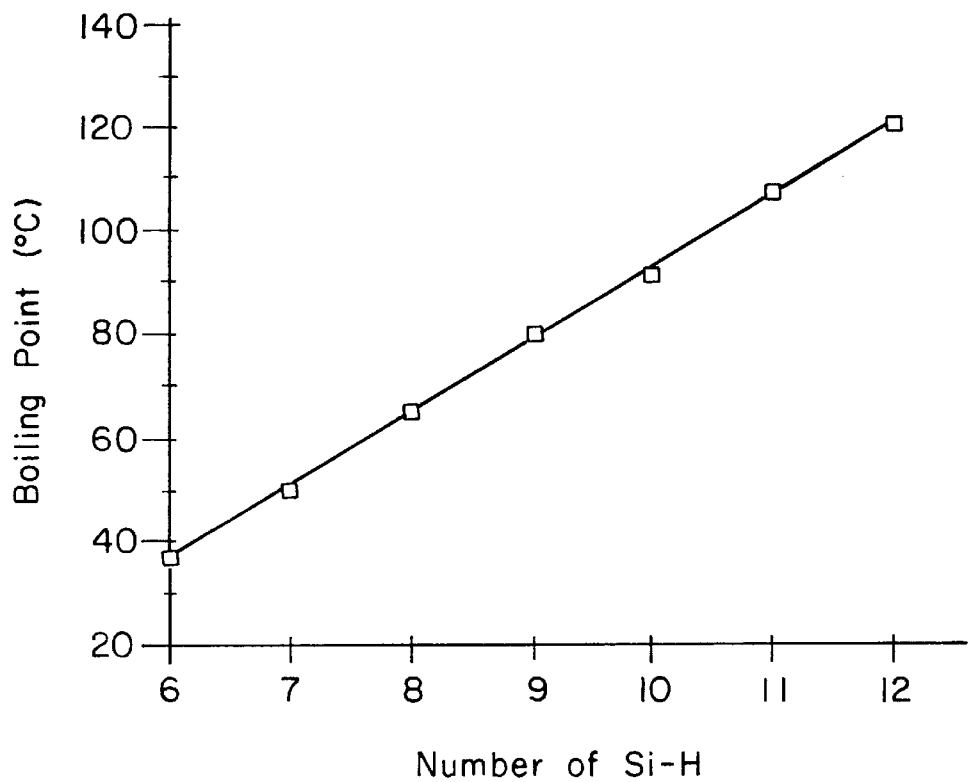
FIG. 1 is a graphical comparison of boiling points of compounds of the homologous series $D_n^H$, where n=6 to 12.

The present invention is directed toward the synthesis of higher order star polymers having many (i.e., preferably more than six) polyisobutylene arms emanating from a core of condensed siloxanes, preferably cyclosiloxanes. Generally, the synthesis involves hydrosilation of olefin-terminated, preferably allyl-terminated, PIB prearms by siloxanes preferably having at least two, and more preferably from about 3 to 20 SiH groups (e.g., $D_n^H$ where n equals from about 3 to 20) and competitive moisture-mediated core-core coupling. In other words, higher order star polymers, i.e., those star polymers having a condensed cyclosiloxane core of more than three primary or first order stars coupled together, were prepared by exploiting and controlling the rate of conversion of SiH groups to SiOH groups, thereby controlling the process of core-core coupling. This process, i.e., core-core coupling, has been found to be dependent upon the presence of water. The multi-arm stars were formed by designed core-core coupling of siloxanes such as alkyl- and phenyl-cyclosiloxanes. For instance, stars have been formed using small methylcyclosiloxanes (e.g., $D_4H$, $D_6^H$, etc.) carrying a number of PIB substituents in the presence of moisture (i.e., water) under hydrosilation conditions.

It will be appreciated that, heretofore, control of the synthesis of these higher order star polymers was not thought possible, and it has unexpectedly been found that not only can these higher order stars be formed under proper conditions, but also that the processes of hydrosilation of PIB—CC=C and other olefin-terminated polyisobutylenes with inexpensive common siloxanes, particularly cyclosiloxanes, and core-core coupling occurs simultaneously so that first-order stars condense to higher-order multi-arm stars in the presence of effective amounts of water.

The following reaction scheme involving PIB—CC=C and $D_4^H$, shown without its $CH_3$ groups as component A, essentially shows the synthetic process of the present invention.

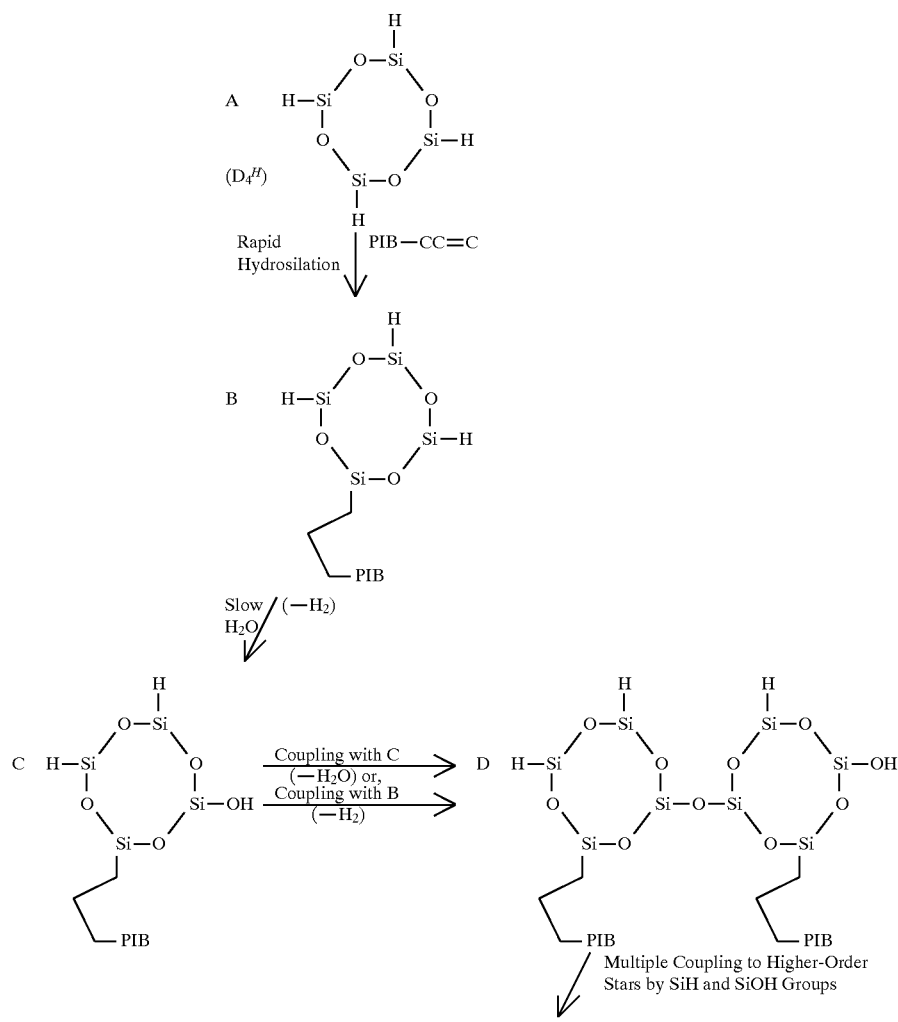

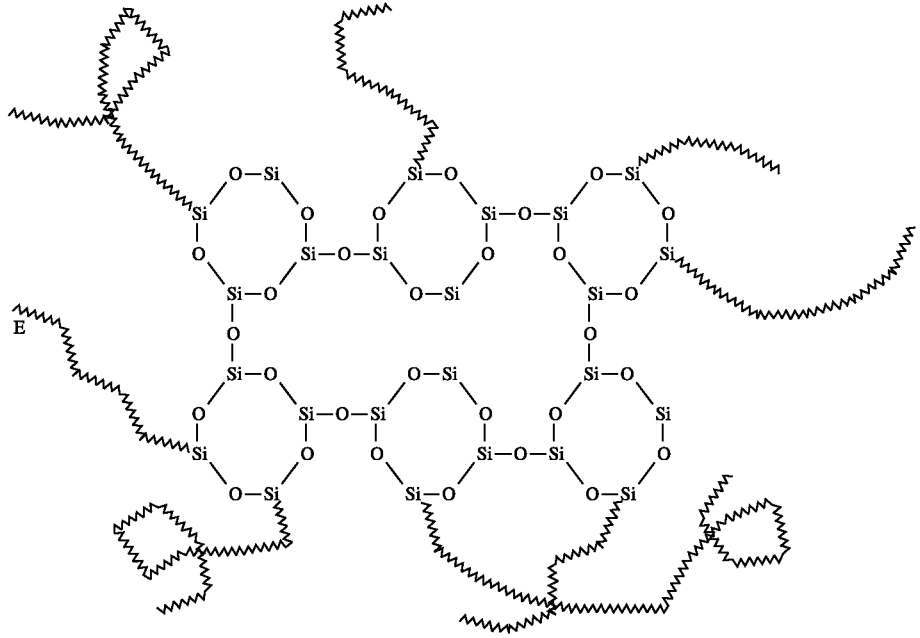

It will be appreciated that the synthesis of the higher order star polymers begins with the synthesis of first-order or primary star polymers as described in U.S. patent application Ser. No. 08/620,421. Such first-order stars, shown as component B in the scheme hereinabove, are synthesized in essentially three steps—(1) preparation of the polyisobutylene arms, (2) preparation of the siloxane core, and (3) linking the arms and the core. Each of these steps are more particularly discussed hereinbelow.

Preparation of the Polyisobutylene Arms—
Polymerization Step

The PIB arms suitable for linking to functional siloxane cores are olefin-terminated polyisobutylenes of desired molecular weights. The preferred olefin-terminated polyisobutylene arms, or "prearms" since they are not yet connected to the core, are α-tert-butyl-ω-allyl-polyisobutylenes (PIB—CC=C) or α-tert-Butyl-ω-isopropenyl-polyisobutylenes (PIB—CC(C)=C) having the following basic structures:

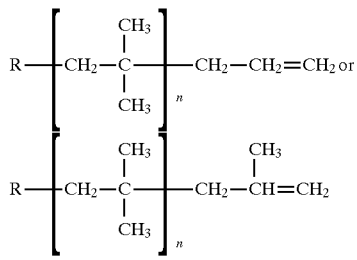

respectively, wherein R may be the same as the allyl- or isopropenyl-terminated end or, alternatively, may be a different terminus known in the art including, but not necessarily limited to, a hydrogen, a alkyl group, a phenyl group or a halogen.

Various routes for the synthesis of olefin-ended PIB prearms may be known in the art, and any route which provides the proper olefin-terminated PIB prearms will be suitable for the present invention. For instance, allyl- or isopropenyl-ended PIBs have been prepared by living polymerization of isobutylene to practically any lengths (and, therefore, to practically any desired molecular weight) followed by quantitative end-functionalization to the —$CH_2CH=CH_2$ or —$CH_2C(CH_3)=CH_2$ terminus.

With respect to the preferred embodiment, α-tert-butyl-ω-allyl-polyisobutylenes (PIB—CC=C) were prepared by a one-pot, two-step method. Living isobutylene polymerization was induced to obtain chlorine-terminated polyisobutylenes by the use of a 2-chloro-2,4,4-trimethylpentane/$TiCl_4$ initiating system in the presence of N,N-dimethylacetamide as the electron pair donor. A detailed description of this procedure is set forth in "Electron Pair Donors in Carbocationic Polymerization. III. Carbocation Stabilization by External Electron Pair Donors in Isobutylene Polymerization", Kaszas et al., *J. Macromol. Sci. Chem., A*26, 1099–1114 (1989), the disclosure of which is incorporated herein by reference. After completion of the polymerizations, the living polymers were then quenched in situ by a 10-fold excess of allyltrimethylsilane ($AllSiMe_3$) which provides PIB—CC=C. A detailed description of this procedure is set forth in "Electrophilic Substitution of Organosilicon Compounds II. Synthesis of Allyl-terminated Polyisobutylenes by Quantitative Allylation of tert-Chloro-Polyisobutylenes with Allyltrimethylsilane", Wilczek et al., *J. Polym. Sci: Polym. Chem.,* 25, 3255–3265 (1987), the disclosure of which is incorporated herein by reference.

To obtain α-tert-butyl-ω-isopropenyl-polyisobutylenes (PIB—CC(C)=C), dehydrochlorination of the chlorine-terminated polyisobutylenes (PIB—Cl) was induced as set forth in "New Telechelic Polymers and Sequential Copolymers by Polyfunctional Initiator-Transfer Agents (Inifers) V. Synthesis of α,ω-Di(isopropenyl)-polyisobutylenes", Kennedy et al., *Polym. Bull.,* 1, 575–580 (1979), the disclosure of which is also incorporated herein by reference. The resultant olefin-capped (e.g., allyl-terminated or isopropenyl-terminated) polyisobutylenes were then characterized by $^1$H-NMR spectroscopy and gel permeation chromatography (GPC). These polymerization processes have been characterized as efficient processes for polymerizing isobutylene.

Preferred polyisobutylenes will have number average molecular weights of from about 500 to about 50,000 g/mol and more preferably, from about 1000 to about 20,000 g/mol, although larger or smaller units may be employed depending upon the circumstances involved.

Preparation of Siloxane Core

Siloxane cores suitable for use in conjunction with the present invention are those siloxanes having functional SiH groups. It will be appreciated that, in this instance, the cyclosiloxane core structure is preferred, as that structure provides the optimal characteristics and/or configuration for the higher order stars to be prepared.

Generally, the resultant polymer stars can be synthesized by the use of various silane ring compounds having the structure:

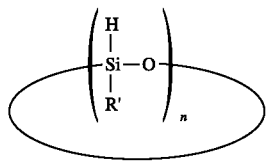

where n may be any integral number from about 3 to 20 or more, depending upon the composition desired. More preferably, n equals from about 4 to 12, and n=4, 5, 6, 7, or 8 is even more preferred. R' may be H, $CH_3$, or any other functional or nonfunctional group limited only by its usefulness to the present invention. Such structures where R'=$CH_3$ are conventionally abbreviated in the art as $D_n^H$, and have been referred to herein in this manner.

An example of a preferred cyclosiloxane compound is hexamethylcyclohexasiloxane ($D_6^H$). $D_6^H$ may be prepared by the hydrolysis of methyldichlorosilane as is well known in the art and as is described in Curry, U.S. Pat. No. 3,484,468, the disclosure of which is incorporated by reference. The structure of $D_6^H$ is shown below.

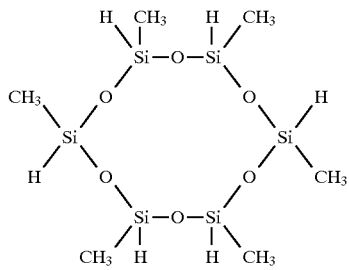

Again, it will be appreciated that the major advantage of these cyclosiloxane cores (e.g., $D_6^H$, etc.) over those cores of PDVB is that these cores are individual, well-defined cyclic compounds and, therefore, yield relatively simple core architectures, as compared to the complex networks created by the PDVB cores, whose characterization is practically impossible. Hereinafter, where cyclosiloxanes are indicated, it will be appreciated that other siloxanes, including linear siloxanes which form "comb"-shaped star polymers may also be used since the linear siloxane backbone and the PIB arms are incompatible, thereby assuring that the linear backbone will assume a tight coil configuration which may also be characterized as the core of a star polymer.

Linking PIB Prearms to Siloxane Core

Once the desired PIB prearms and cyclosiloxane cores are formed, the PIB prearms may be linked to the cyclosiloxanes containing a desirable number of Si—H functions by hydrosilation. An illustrative scheme for the production of the resultant multiple PIB-arm star polymer using PIB—CC=C and $D_6^H$ is shown below.

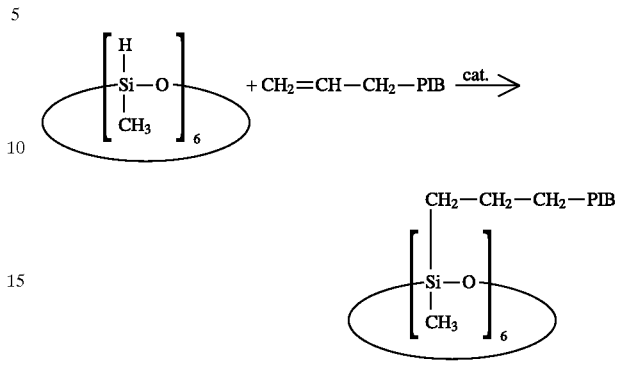

It will be appreciated that the resultant $D_6H$+PIB—CC=C structure provided directly above is only one of many possible structures which could be synthesized via the hydrosilation process. In particular, it should be understood that the resultant composite could contain any number of Si(R')—O units where R' is shown as $CH_3$, but as noted earlier, may be any functional or non-functional group. Thus, the number 6 in the scheme above can generally be replaced with "n" which preferably equates to about 3 to 12. Furthermore, it will be appreciated that PIB, as presented directly above, may include any number of repeating units of the monomer isobutylene plus a terminus, identified earlier as R, wherein R may be the same as or different from the allyl or isopropenyl termini.

Essentially, any siloxane molecule having more than one functional Si—H group can be used to link a plurality of olefin-terminated polyisobutylenes having any number of repeating units to it by hydrosilation using proper reaction conditions. Unless steric compression intervenes, this hydrosilation process proceeds very efficiently to provide the desired first order or primary star structure. Such a first-order star structure is designated generally by the letter B in the initial reaction scheme shown hereinabove. Moreover, since hydrosilation has been demonstrated to be an essentially quantitative reaction, it is believed that the subject process can be performed not only in the research laboratory, but on a commercial scale as well.

Returning to the preferred embodiment of PIB—CC=C and $D_6^H$ as noted hereinabove, hydrosilation is effected by mixing and stirring these two components with an effective amount of $H_2PtCl_6$ for catalyzing the reaction to produce the resultant polymers having multiple polyisobutylene arms emanating from the cyclosiloxane cores. The reactions proceed fast and efficiently.

In order to provide higher order star polymers, it has been found that it is essential that some unreacted SiH groups remain in the first order star polymer after hydrosilation. Thus, hydrosilation must be controlled (e.g., by controlling the [SiH]/[C=C] ratio, temperature, catalyst concentration) to an extent that a certain number of SiH groups survive the hydrosilation process. Complete linking of all SiH groups to PIB—CC=C will prevent core-core coupling.

In essence, the present invention revolves around the discovery that, in addition to the hydrosilation of PIB—CC=C, some of the residual SiH functions will be converted, in the presence of water (and depending on reaction conditions), to SiOH groups as shown as Component C in the initial reaction scheme hereinabove (Scheme I) which, in turn, will rapidly self-condense (2 Si—OH→Si—O—Si+$H_2$O) or will react with SiH (Si—OH≡SiH→Si—O—Si+$H_2$) to form coupled cyclosiloxane molecules, shown as Component D in Scheme I, by core-core coupling. That is, the reaction process may include the reaction of two Components C in Scheme I, or the reaction of a Component B with Component C in Scheme I to create Component D. Depending on reaction conditions, these processes (i.e., hydrosilation and various core-core couplings) have been found unexpectedly to proceed simultaneously and competitively at various rates until the reactive functions (PIB—CC≡C, SiH, Si—OH) are consumed or become inactive due to steric hindrance. The outcome of these reactions have resulted in higher order stars having many more arms of polyisobutylene than would be obtained with first order stars. As shown as Component E in Scheme I wherein several cyclosiloxane molecules are shown joined together and wherein wiggly lines indicating PIB radiate from an Si component of the cyclosiloxanes, the resultant higher-order multi-arm star comprises many more PIB arms emanating from a complex core of condensed cyclosiloxanes than could be found on any one individual siloxane of a first order star. Moreover, the higher order star may still contain several unreacted —H or —OH groups. In view of the large number of high molecular weight PIB arms (and low molecular weight methylcyclosiloxane rings) the relative size and weight proportion of the condensed core relative to the overall structure is small, if not negligible.

The condensation of the small SiO rings to give rise to the final condensed core may proceed via a variety of routes, the precise route of which is extremely difficult to discern. It is believed that the mechanism starts by having certain SiOH groups rapidly self-condense (2 Si—OH→Si—O—Si+$H_2$O) or react with SiH (Si—OH≡SiH→Si—O—Si+$H_2$) to form second order stars. Further reactions of core-core couplings or hydrosilation provide for increasingly complex molecules of higher order stars after the initial core-core coupling stage. It is further believed that condensations of Component D→E (Scheme I) would be largely governed by statistics, and bear a certain resemblance to star formation by linking of living species, both anionic and cationic. It is known that the postulated condensations are accelerated in the presence of hydrosilation catalysts. Also, water affects the competitive reactions and at least trace amounts of moisture is present even in carefully dried charges. However, until now, it was not known that control of the moisture content and other conditions can be used to control the synthesis of the higher order stars.

Experimental

In order to demonstrate practice of the present invention, several higher order stars having clusters of three or more, and preferably many more, cyclosiloxanes from which emanate many polyisobutylene arms were prepared. Notably, the size of the core as well as the number of arms, which ultimately controls rheological properties, can now be controlled. The following is a detailed description of the process (es) used for carrying out the present invention. It will be appreciated that this description is illustrative only and is not meant to limit the invention, as measured by the scope and spirit of the claims.

A. Preparation of Stars

To begin, various methylcyclohexasiloxanes were prepared, including hexamethylcyclohexasiloxane, $D_6^H$, and dodecamethylcyclododecasiloxane, $D_{12}^H$ $D_{12}^H$ was obtained by fractional distillation of a mixture of $D_n^H$ where n=5,6,7,8,9, etc. (a side product of the manufacture of $D_4^H$ by hydrolysis of dichloromethylsilane), by using a spinning band column (Nester/Faust, 75 theoretical plates) under reduced pressure. The fraction of bp 120° C./0.25 mm Hg was collected and yielded 1.4 g (0.15%). According to GC analysis this fraction consisted of 87.3% $D_{12}^H$, 3.1% $D_{11}^H$, and 8.6% $D_{13}^H$. The product was stored over $CaH_2$. $^1$H NMR spectroscopy (200 MHz, $CDCl_3$) showed δ=0.19 (s, 3H in Si—$CH_3$); 4.80 (s, 1H in Si—H). Fractional distillation of $D_n^H$ also yielded $D_6^H$ (7.4%), $D_7^H$ (2.4%), $D_8^H$ (1.0%), $D_9^H$ (0.68%), $D_{10}^H$ (0.32%), $D_{11}^H$ (0.36%). FIG. 1 shows the relationship of boiling points as a function of the number of Si atoms in $D_n^H$ where n=6 to 12.

Next, α-tert-butyl-ω-allyl-PIB prearms (PIB—CC≡C) were prepared by a two-step one-pot method. First, chlorine-terminated PIB (PIB—Cl) was obtained by the 2-chloro-2,4,4-trimethylpentane/$TiCl_4$/N,N-dimethylacetamide system as is known in the art. The living polymers were quenched by a 10-fold (PIB2 in Table I), 20-fold (PIB3 in Table I), and 50-fold (PIB4 in Table I) excess of allyltrimethylsilane. α-tert-butyl-ω-isopropenyl-PIB prearms (PIB—CC(C)≡C) were obtained by dehydrochlorination of PIB—Cl. The products were characterized by $^1$H-NMR spectroscopy (200 MHz for PIB—CC(C)≡C and 600 MHz for PIB—CC≡C) and GPC.

Figure 2:
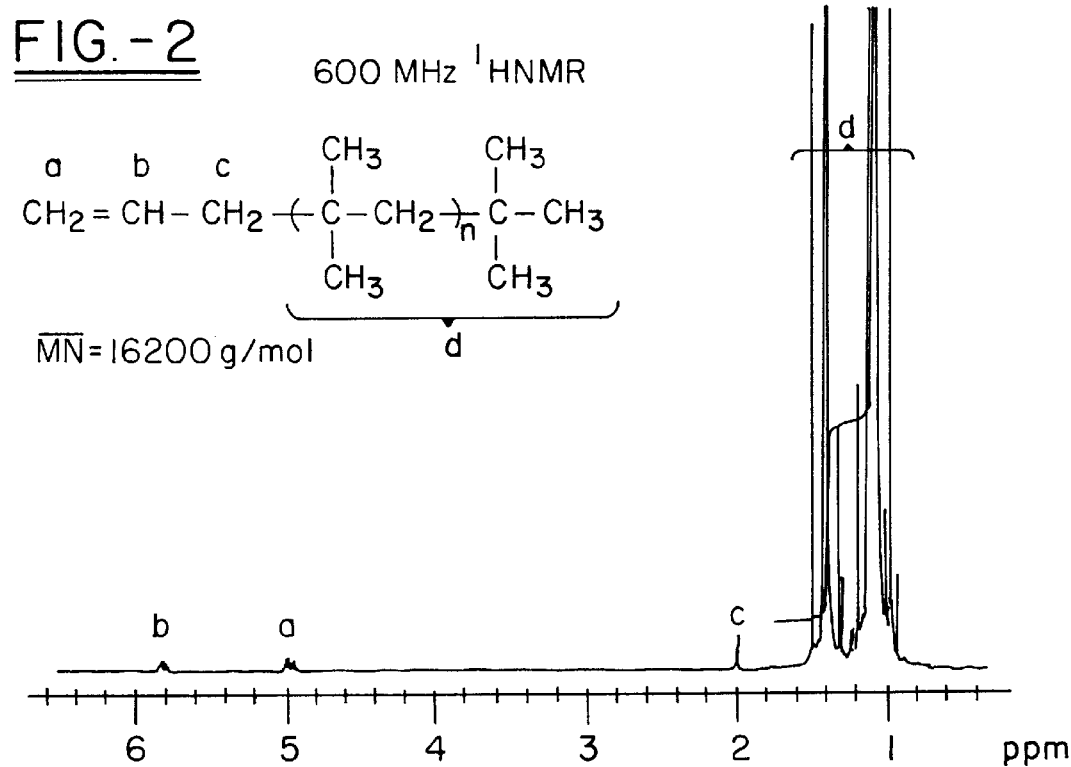
FIG. 2 is a representative $^1$H-NMR (600 MHz) spectrum of an allyl-terminated polyisobutylene (PIB—CC=C).

The number average and weight average molecular weights ($M_n$, $M_w$, respectively) and dispersities ($M_n/M_w$) of the linear PIB prearms (PIB—CC≡C) were determined by GPC as known in the art. The products were further characterized by $^1$H NMR spectroscopy by the use of a 200 or 600 MHz Varian Gemini Spectrometer and standard 5 mm tubes at ambient temperature with 19 mg samples/mL $CDCl_3$. In 600 MHz NMR, 32 FIDs were collected with 3.0 s acquisition time for 3.3 μs pulse width. FIG. 2 shows a representative 600 MHz spectrum of a PIB—CC≡C ($M_n$=16,200 g/mol) together with assignments of the particular components thereof. The structure of PIB—CC(C)≡C prearms were characterized by 200 MHz $_1$H NMR spectroscopy with 2052 FIDs, but are not shown herein.

The number average end group functionality ($F_n$) was calculated by (1) determining $M_n$ by GPC(RI); (2) quantitating the allyl groups (i.e., the protons associated with $CH_2$=CH—$CH_2$— group at δ=5.8 (proton b in FIG. 2), δ=5.0 (proton a in FIG. 2) and δ=2.0 (proton c in FIG. 2) relative to the total amount of PIB protons in the (δ=0.8–0.7 range (proton d in FIG. 2); and dividing (1) by (2). Table I summarizes structural characteristics of the PIB prearms prepared and used.

TABLE I

Characterization of PIB Prearms Mn (g/mol)

| PIB | End Group | GPC | NMR | Mw/Mn | $F_n$* |
|---|---|---|---|---|---|
| 1 | i-propenyl | 3900 | 3722 | 1.06 | 1.05 |
| 2 | Allyl | 9300 | 9300 | 1.18 | 1.00 |
| 3 | Allyl | 16700 | 16200 | 1.13 | 1.03 |
| 4 | Allyl | 31700 | 35000 | 1.16 | 0.91 |

*Number average end group functionality by GPC/$_1$H NMR data.

The $M_n$, $M_w$ and $M_w/M_n$ of these first order stars were obtained by a GPC instrument equipped with an on-line refractive index(RI) and laser light scattering (LLS) detector (Minidawn, Dawn F. Wyatt Technology Co.) in conjunction with an Optilab Instrument (also of Wyatt Technology) which provided dn/dc values. The data were evaluated by Astra 4.0 software (Wyatt Technology), and $M_n$ was calculated from $M_w$ data obtained by DPC(LLS), using the Astra 4.0 software.

For the calculation of the number of arms ($N_n$) of higher order stars, the $M_n$ of the core was considered negligible relative to that of the sum of the arms. A simple calculation illustrates the basis for this simplification. We have found empirically that higher order stars can be readily obtained by the use of a [SiH]/[C≡C]=4 stoichiometry, in other words, with $[D_6^H]$/[C≡C]=6/4=1.5 moles. Thus, for instance, a 30-arm star will contain a core of 20 condensed $D_6$ rings (mol. wt.=360) representing for the core a total of $M_{n,core}$=7200 g/mol (i.e., 20 ×360). With PIB prearms of, for example, $M_n$=9300 or $M_n$=16,200 g/mol, the total $M_n$ of the coronas will be 279,000 or 486,000 g/mol respectively. Hence, the experimental error by the above simplification will be a negligible 2.6 or 1.5%, respectively.

Initial investigations of first order (or primary) stars began with the following representative procedures. To a homogeneous solution of PIB—CC≡C (162 mg, 0.0174 mmole, of $M_n$=9300 g/mol), $D_6^H$ (1.04 mg, 0.00289 mmole, in about 1 mL dry cyclopentane), were added about 10 mg $CaH_2$ and about 3.6 μL $H_2PtCl_6$ in toluene. The system was agitated, distributed to 5 dry sample vials (8 mL), and the cylcopentane was removed by vacuum. The sample vials were placed in a nitrogen blanketed desiccator containing $CaCl_2$. After about 1.5, 3, 6, 24, and 168 hours at room temperature (about 23° C.), an excess of about 1 mL of 1-pentene was added to the active charges to quench the reactions. The samples were immediately analyzed by GPC(LLS) as to extent of conversion, molecular weight, and dispersity. Core-core coupling was absent after 9 days indicating that the THF was reasonably dry.

Conversions were determined by correlating the GPC(RI) peak area of the star to that of unreacted PIB—CC≡C and correcting with the appropriate dn/dc values ((dn/dc)$_{9K-4.4}$=0.118, (dn/dc)$_{PIB—, Mn=9300}$=0.118).

In some instances, stars are abbreviated by a combination of two symbols, the first of which indicates the number average molecular weight ($M_n$) of the arms, and the second the number of arms (Nn). For example, 9K-4.4 designates a star having 4.4 PIB arms, each arm of $M_n$=9,000 g/mol.

The above procedure was also used to obtain higher order stars, except the concentration of $D_6^H$ was greater (4.18 mg, 0.0116 mmole). This, in theory, meant that more SiH groups existed and were susceptible to core-core coupling.

Further syntheses of first order and higher order stars were then conducted. For first order stars (9K-4.4), the following procedure was employed. To a homogeneous solution of PIB—CC≡C (4942 mg, 0.532 mmole, $M_n$=9300 g/mol), $D_6H$ (39.9 mg, 0.111 mmole) in about 20 mL dry cyclopentane was added to about 114 μL $H_2PtCl_6$ in toluene and about 50 mg $CaH_2$. The charge was placed in a petri dish and the cyclopentane was removed by vacuum. The system was placed in a $N_2$ filled desiccator containing $CaCl_2$ for 10 days at room temperature (23° C.). After this period of 10 days, an excess (about 10 mL) of 1-pentene was added to the charge to quench the reactions, and the system was filtered to remove the $CaH_2$ drying agent. After being purified by participating with hexane/acetone to remove the Pt catalyst, the product was dried in a vacuum oven at 60° C. for 3 days and analyzed for conversion, molecular weight and dispersity by GPC(LLS).

For higher order stars (16K-22), the following procedure was employed. To a homogeneous solution of PIB—CC≡C (4875 mg, 0.301 mmole, $M_n$=16,200 g/mol), $D_6^H$ (72.3 mg, 0.201 mmole) in about 10 mL dry cyclopentane was added to 114 μL $H_2PtCl_6$ in toluene solution. The charge was placed in a 100 mL flask, and the cyclopentane was removed by evacuation. The flask was capped and placed in a heating oven at 120° C. for 2 weeks. After this period, the reaction was terminated by the introduction of an excess (about 10 mL) of 1-pentene, and the product was dissolved in about 30 mL hexane and precipitated in an excess of acetone as is known in the art. After filtering, the product was vacuum dried at 60° C. for 3 days) and analyzed as to conversion, molecular weight and dispersity by GPC(LLS).

Still further, comb-shaped star polymers were prepared (16K-24C). To a homogeneous solution of PIB—CC≡C (5341 mg, 0.330 mmole, $M_n$=16,200 g/mol), $MD_{38}^HM$ (38.4 mg, 0.0157 mmole), and about 10 mL of dry cyclopentane were added with $H_2PtCl_6$ (123 μL, in toluene solution). The charge was placed in a petri dish and the cyclopentane was removed by vacuum. The system was placed in a $N_2$ filled desiccator containing $CaCl_2$ for 2 weeks at room temperature (about 23° C.). After this period, an excess (about 10 mL) of 1-pentene was added to the charge to quench the reaction, and the system was filtered to remove the $CaH_2$ drying agent. The product was dried in a vacuum oven at 60° C. for 3 days and analyzed by GPC(LLS) as to conversion, molecular weight and dispersity.

B. Characterization of Stars

Star polymers (19 mg/mL $CDCL_3$) were characterized by $^1$N NMR spectroscopy by the use of a 600 MHz Varian Gemini Spectrometer, standard 5 mm tubes and $CDCl_3$ at ambient temperature (see conditions used for prearms). Stars (prior to quenching with 1-pentene) were characterized without purification (no precipitation) to avoid hydrolysis of SiH groups. Peak assignments were as follows: δ=0.0–0.2 (Si—C$H_3$); 0.4–0.5 (Si—C$H_2$—CH$_2$—CH$_2$PIB); 0.8–1.7 (PIB protons); 4.7 (Si—$H$). The Si—C$H_3$ peak is split into two peaks. The peak at δ=0.00–0.12 is due to C$H_3$—Si—CH$_2$—CH$_2$—CH$_2$—PIB, and that at δ=0.12–0.20 is due to C$H_3$—Si—H. The peak integrals yielded to following quantities (normalized to 1 mol of PIB):

$$Si—CH_3 = \frac{I_{0.0-0.2}}{3} \times \frac{H_{PIB}}{I_{0.8-1.7}}$$

where $I_{0.0-0.2}$ is the resonance integral for Si—$CH_3$ protons in the d=0.0–0.2 range, and $I_{0.8-1.7}$ is that for all PIB protons and H in PIB is the number of protons of PIB.

$$\text{Core content} = \frac{Si—CH_3 \times 60.1}{PIB_{M_n} + Si—CH_3 \times 60.1}$$

$$\text{Remaining SiH}_{core} = I_{4.7} \times \frac{H_{PIB}}{I_{0.8-1.7}}$$

$$\text{Consumed SiH} = \frac{I_{0.4-0.5}}{2} \times \frac{H_{PIB}}{I_{0.8-1.7}}$$

$$Nn,NMR = N_{SiH} \times \frac{\text{Consumed SiH}}{Si—CH_3}$$

where $N_{SiH}$ is the number of SiH group per core. Since the Si—OH resonance cannot be separated from the broad resonance, the total moles of hydrolyzed SiH (Si—OH) and condensed core (Si—O—Si) are calculated as follows:

SiH Converted to Si—OH or Si—O—Si=Si—CH$_3$—consumed SiH—Remaining SiH

Since the star polymers were contaminated by unreacted PIB prearms (PIB-content 7–20%), their intrinsic viscosities were corrected as follows:

$$[\eta]_{star}=([\eta]_{expt.}-\omega_{arm}[\eta]_{arm})/\omega_{star}$$

where $\omega_{arm}$ and $\omega_{star}$ are the weights of the arm and the star polymer, respectively. The $[\eta]_{arm}$ values were obtained by measuring the intrinsic viscosities of six different PIBs in the range $M_w$=11000–377,000 g/mol at six temperatures in the 30° C. range and calculating the Mark-Houwink constants, K and a, from these data.

The branching coefficients were calculated by $$g^* = \left| \frac{[\eta]_{star}}{[\eta]_{linear}} \right|_{tol}^{T,M_W}$$

To determine acid resistance, the following procedure was used. Into a 20 mL vial were charged star polymer (20 mg) in 1 mL xylene (if desired) and concentrated or 50% sulfuric acid (4 mL). The vial was sealed and placed in a heating oven at 70° for 3 days, 1 week, and 3 weeks. Mixing was provided by heat convection. Subsequently, the vial was opened and the charge was diluted by 3 mL n-hexane. The organic layer was separated and washed with water several times until neutral. The volatiles were removed in vacuum, and the product analyzed by GPC(LLS), specifically, to determine the $M_n$ (by Astra software) and the amount of star remaining relative to the peak characteristic of PIB.

To determine base resistance, the following was used. Into a 20 mL vial were charged star polymer (20 mg) in 1 mL of xylene and t-BuOK (50 mg). The vial was sealed and placed in a heating oven at 70° C. for 1 day, 3 days, 1 week and 2 weeks. Subsequently, the vial was opened and the remaining t-BuOK was removed by filtration. The volatiles were removed in vacuum, and the product analyzed by GPC (LLS), specifically, to determine the $M_n$ (by Astra software) and the amount of star remaining relative to the peak characteristic of PIB.

Simultaneously, control experiments were also carried out under similar conditions with decamethylcyclosiloxane ($D_5$) in the presence of n-nonane as internal standard, to ascertain the quantitative hydrolysis of a cyclosilane similar to that of the core.

Base resistance was also tested under more aggressive condition as follows. Into a 100 mL one neck flask were placed primary star 9K-4.4 (120 mg), ethanol (6.0 g), tetrahydrofuran (12.5 g) and t-BuOK (0.2 g), and the solution was refluxed for 1 week. After filtration, the volatiles were removed by vacuum, and the polymer analyzed by GPC to ascertain the disappearance of the star and the survival of the PIB arms.

The heat stability of primary and higher-order stars (5–10 mg samples), together with appropriate linear PIB and siloxane controls, were studied by using a DuPont Thermogravimetric Analyzer (Model 951 and Computer, Model 9900) in air by heating to 600° C. at 10° C./min. The temperatures at 5, 10, 20 and 30% weight loss were determined.

C. Results and Discussion

The first phase of this research was directed toward an exploration of reaction conditions leading to the efficient synthesis of primary or first order stars. Specifically, kinetic experimentation was carried out to gain insight into the various effects (e.g., nature and molecular weight of PIB prearms, size of cyclosiloxane core, reagent stoichiometry) on conversions and number of arms.

Figure 3:
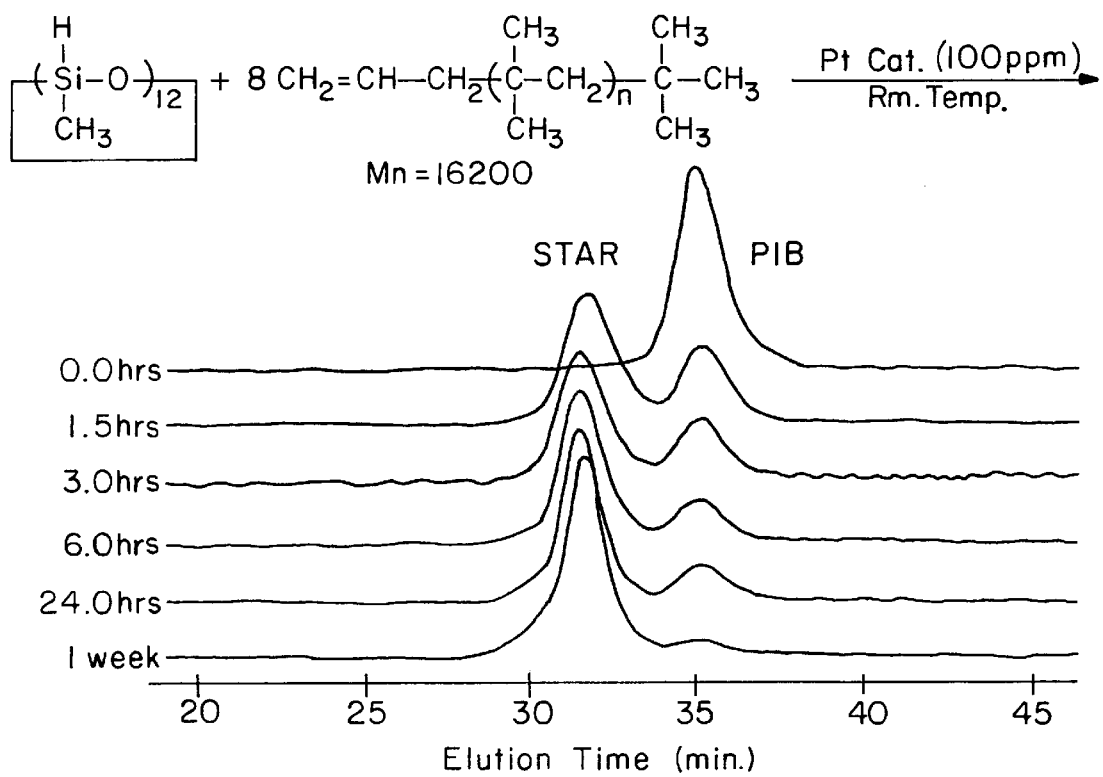
FIG. 3 is a representative series of GPC(RI) traces of first order star formation via hydrosilation.

FIG. 3 and Table II summarize the results of a representative kinetic study of hydrosilation of PIB—CC=C by $D_{12}^H$ at [SiH]/[C=C]=1.5.

TABLE II

Kinetics of Primary Star Formation ([SiH]/[C=C] = 1.5)

| | | Experimental Data*** | | | Calculated Values | |
|---|---|---|---|---|---|---|
| Time h* | Conv. %** | $N_n$ | Mn × 10³ g/mol | Mw/Mn | $N_{n,calc.}$ | Mn, calc. × 10₃ g/mol |
| 1.5 | 64 | 5.6 | 91 | 1.26 | 5.1 | 84 |
| 3.0 | 69 | 6.1 | 99 | 1.25 | 5.5 | 90 |
| 6.0 | 80 | 6.6 | 108 | 1.25 | 6.4 | 104 |
| 24 | 81 | 7.1 | 115 | 1.26 | 6.5 | 105 |
| 168 | 92 | 8.2 | 133 | 1.27 | 7.4 | 120 |

*Reaction quenched by 1-pentene.
**By RI
***Calculated from LLS data.

Table II shows the data obtained by GPC(LLS), and in the last two columns Nn and Mn calculated from conversions by $$Nn \text{ calc.}=(N_{SiH}/([SiH]/[C=C]))\times \text{Conversion}$$

Mn, calc.=Nn×(Mn of prearms)+Mn of siloxane core

Comparison of experimental and calculated $N_n$'s are in satisfactory agreement. (This agreement also indicates that the dn/dc values were accurate.) The fact that the experimental Nn data are somewhat higher than calculated values suggests minor (e.g., second or third order) core-core coupling.

As shown by the family of GPC(RI) traces, the peak associated with the PIB prearms (~35 min) gradually decreases whereas that signaling the star (about 32 min.) increases and its shape narrows. After one week, the conversion to star polymer is almost quantitative (about 92%) and the narrowness of the peak ($M_w/M_n$=1.27) suggests the formation of a well-defined primary star. Significantly, the $M_n$s and the number of arms, $N_n$, increase monotonically, and $N_n$ reaches the theoretical value of 8 (considering [SiH]/[C=C]=1.5).

Figure 4:
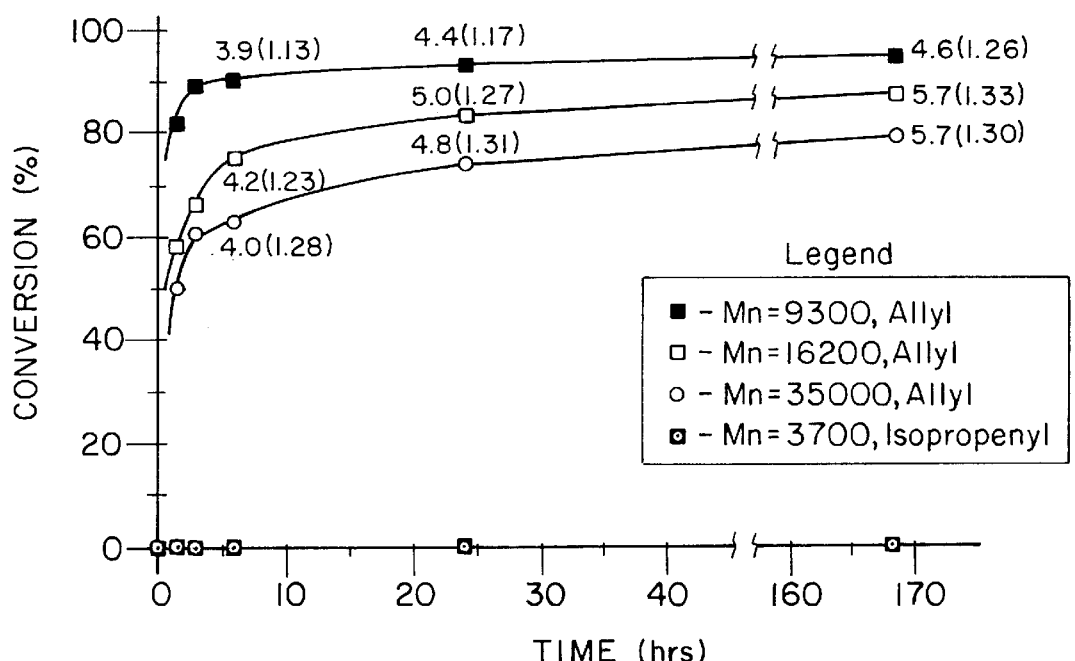
FIG. 4 is a graphical representation of the relative rate of hydrosilation of ω-allyl- and ω-isopropenyl-PIB prearms of different molecular weights in conjunction with $D_6^H$ over time at [SiH]/[C=C]=1.5 at room temperature.

A series of experiments were carried out by the use of different prearms (PIB—CC=C and PIB—CC(C)=C) and different prearm molecular weights (see Table I). FIG. 4 summarizes experimental conditions and results. As expected, primary star formation is fastest with the lowest molecular weight PIB—CC=C, however, somewhat unexpectedly, star formation was absent with PIB—CC(C)=C even though its $M_n$ was quite low. Evidently, steric compression by $CH_3$ greatly retards star formation by hydrosilation. The dispersity of all the stars was quite narrow ($M_w/M_n$=1.1–1.3) showing a slight but persistent broadening with time. This phenomenon may be due to the onset of core-core coupling. The theoretical Nn(Nn, theor.) in these experiments is 4.0, however, the data show a continuous increase with time. The Nn obtained with the higher molecular weight PIB prearms exceeded Nn, theor. due to competing core-core coupling.

Figure 5:
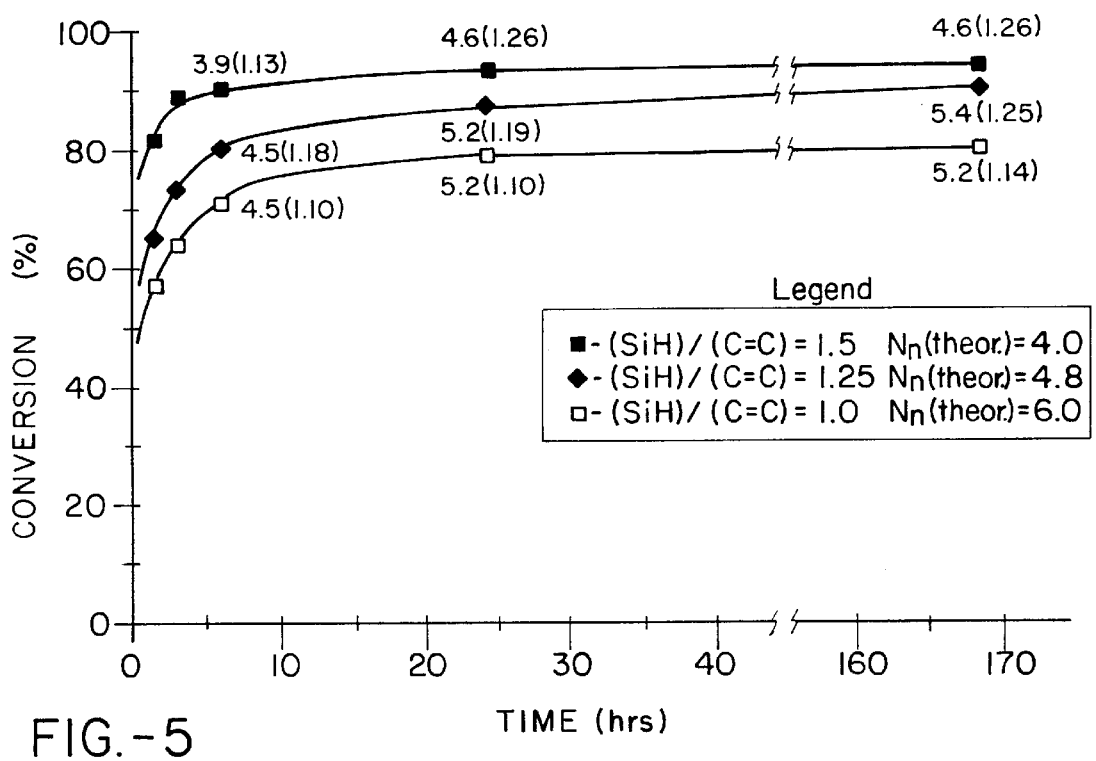
FIG. 5 is a graphical representation of the relative rate of hydrosilation of ω-allyl-PIB prearms by $D_6^H$ at different [SiH/C=C] ratios using PIB2 from Table I.

FIG. 5 summarizes the results of three series of experiments in which the [SiH]/[C=C] ratio was varied. Fastest conversion to star polymer was obtained by the use of [SiH]/[C=C]=1.5, however, product dispersity was relatively broad ($M_w/M_n$=1.26) and Nn=4.6. These data indicate minor core-core coupling. Evidently remaining SiH groups react with $H_2O$ and lead to condensation. With [SiH]/

[C=C]=1.0, the dispersity was narrow ($M_w/M_n$=1.14), but conversion reached only about 80%.

Figure 6:
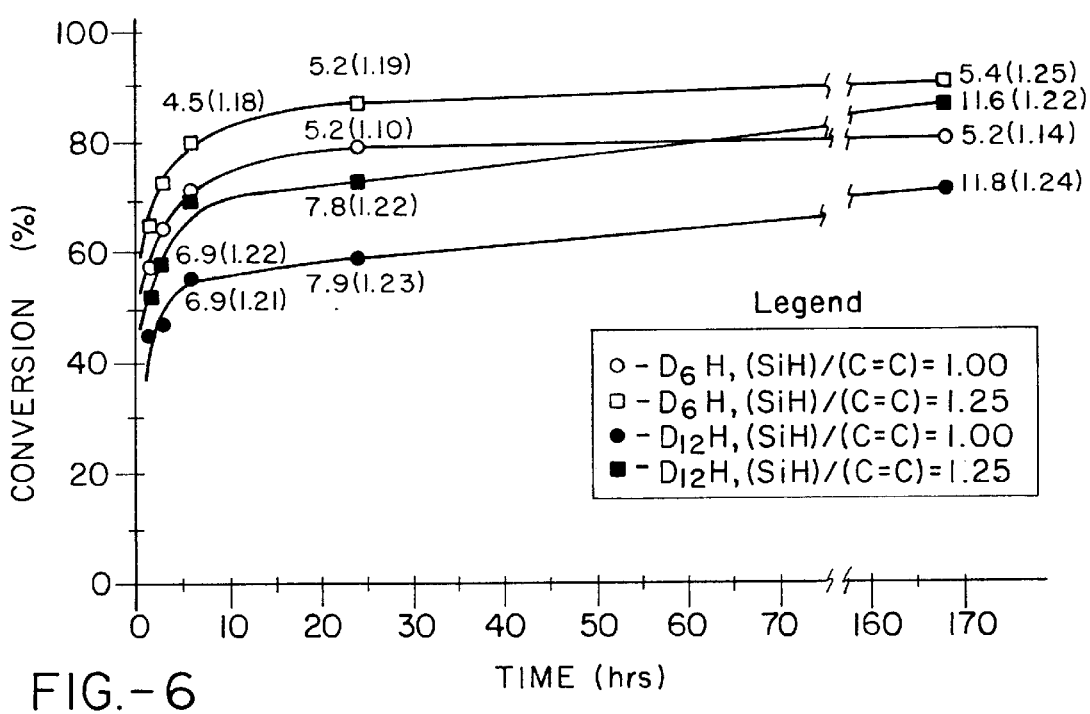
FIG. 6 is a graphical representation of the rate of hydrosilation of ω-allyl-PIB prearms by $D_6^H$ and $D_{12}^H$ at [SiH/C=C]=1.0 and 1.25 using PIB2 from Table I at room temperature.

Unexpected insight into the details of star formation was obtained by experiments in which the rate of star formation with $D_6^H$ and $D_{12}^H$ was compared. FIG. 6 summarizes the results of four series of experiments showing the rates of hydrosilation of PIB—CC=C ($M_n$=9,300) by $D_6^H$ and $D_{12}^H$ at two stoichiometries (i.e.,[SiH]/[C=C]=1.0 and 1.25). Interestingly, $D_{12}^H$ was found to be less reactive initially than $D_6^H$ at both stoichiometries, and the dispersities of the stars obtained with the larger cyclosiloxane were broader than with the smaller ring.

An explanation for this observation was provided by computer stimulated models. That is, computer modelling of $D_6^H$ and $D_{12}^H$ indicated that in $D_6^H$ all $CH_{3-}$ and H— substituents on the Si's are forced toward the outside of the ring so that the SiH groups are readily available to react. In contrast, in the larger loser $D_{12}^H$, some of the SiH groups are initially inside the ring cavity and therefore are less available for hydrosilation. Interestingly, with the $D_{12}^H$ system the number of arms increases relatively rapidly between 30 and 170 hrs. This phenomenon suggests a change in the core conformation with progressing hydrosilation.

An examination of interatomic distances between silicone atoms substantiates this conclusion. According to the data, the maximum distance between two silicone atoms in $D_6H$ (i.e., between Si1 and Si4) is 6.16 Å, on the other hand in $D_{12}^H$, the maximum distance (between Si5 and Si 11) is 9.54 Å. The distance between Si and H in Si—$Ch_3$ is about 2.52 Å. Thus, it would be difficult for $D_6^H$ to assume a conformation in which the H and $CH_3$ substituents on Si are inside the ring. This means that the both H and $CH_3$ are preferentially outside the ring, i.e., all the SiH groups are available for hydrosilation. In contrast, for $D_{12}^H$, it is easier to assume conformations in which the H and $CH_3$ substituents on Si are inside the ring, i.e., some of the SiH are buried and will be less available for hydrosilation during the first phase of hydrosilation (<30 hrs, see FIG. 6).

Analysis of the rate of increase of $N_n$ (see FIG. 6) holds further clues as to the reaction mechanism. In the case of $D_{12}^H$, $N_n$ increases dramatically during the period from 1 day to 1 week (i.e., $N_n$ grows from about 8 to about 12) whereas with $D_6^H$ this effect is close to negligible ($N_n$ about 5.2 to about 5.3). The large increase in $N_n$ with $D_{12}^H$ indicates the onset of relatively rapid core coupling with $D_{12}^H$. This process would occur because SiH groups (both outside and inside the ring) can preferentially react with the small highly mobile $H_2O$ molecules leading to core condensation by the process outlined in Scheme I. In contrast, in the case of $D_6^H$, hydrosilation of PIB—CC=C is relatively rapid on account of the available unhindered SiH groups, so that the opportunity for core coupling is reduced.

Based this knowledge, higher order star polymers were developed. Higher order stars arise by covalent bond formation between two or more first order (or primary) stars (core-core coupling, and therefore contain a multiplicity of arms emanating from condensed primary stars, typically have four or more first order star cores bonded together.

Figure 7:
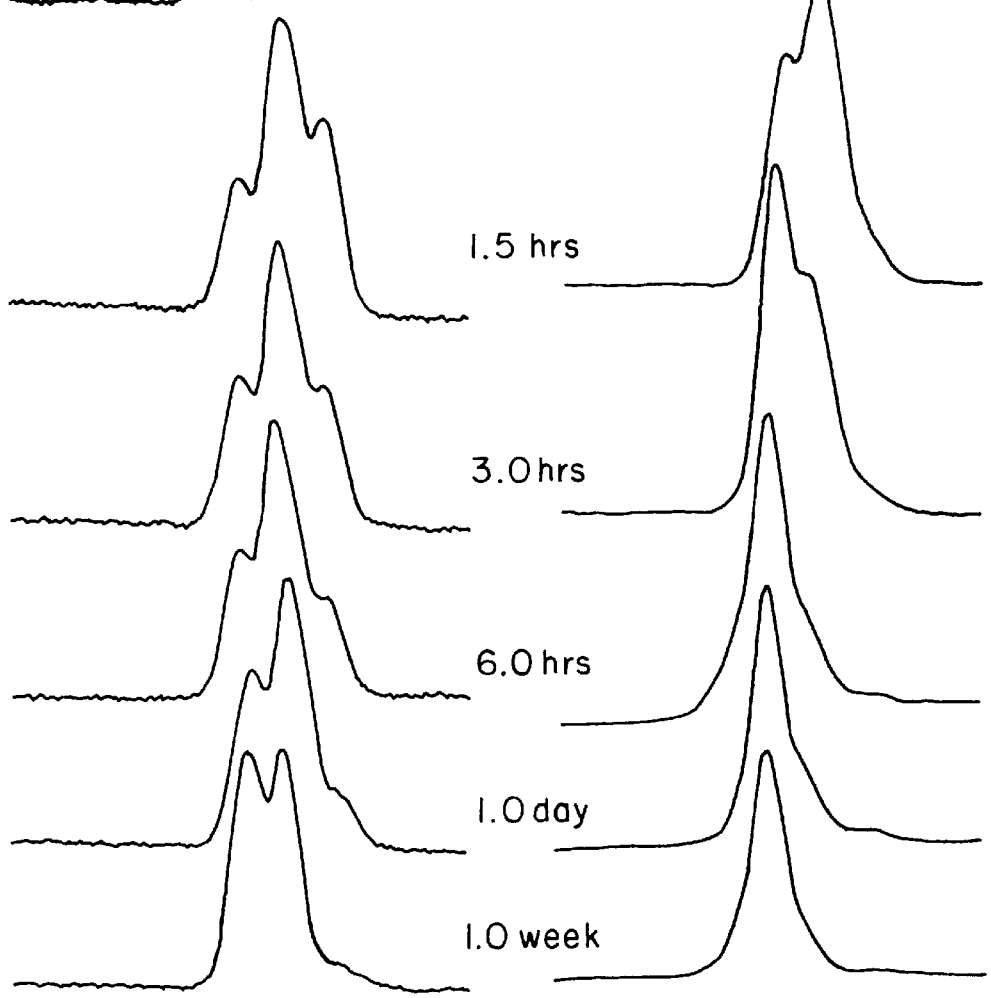
FIG. 7 is a representative series of GPC(RI) traces of higher order stars wherein PIB—CC=C (PIB2 in Table II) and $D_6^H$ were reacted (a) at room temperature and (b) at 120° C.

FIG. 7 shows evidence for the formation of higher order star polymers. It summarizes the results of two series of experiments in which PIB—CC=C+$D_6^H$ were reacted at room temperature and at 120° C. According to the GPC(RI) traces collected at various times, at room temperature the peak indicating the PIB prearm (about 35 min) decreases steadily, until after one week only a very small amount of residual prearm remains, whereas at the same time two new peaks (at about 34 and about 32 min) appear, most likely indicating the presence of higher order stars. With increasing time the relative amounts of the two peaks gradually shift toward the higher molecular weight (lower elution time) species and after one week the two major higher order star components are present in approximately the same proportion. In contrast, the events unfold much more rapidly at 120° C.: The PIB prearm disappears more rapidly and the relative quantities of the two major higher-order stars (peaks at about 34 and about 32 min) shift in favor of the higher molecular weights species. Similarity of the GPC(RI) traces suggest that 1.5 hrs at 120° C. is approximately equivalent to one day at room temperature. For all practical purposes higher order star formation is essentially complete in 6–24 hrs.

Figure 8:
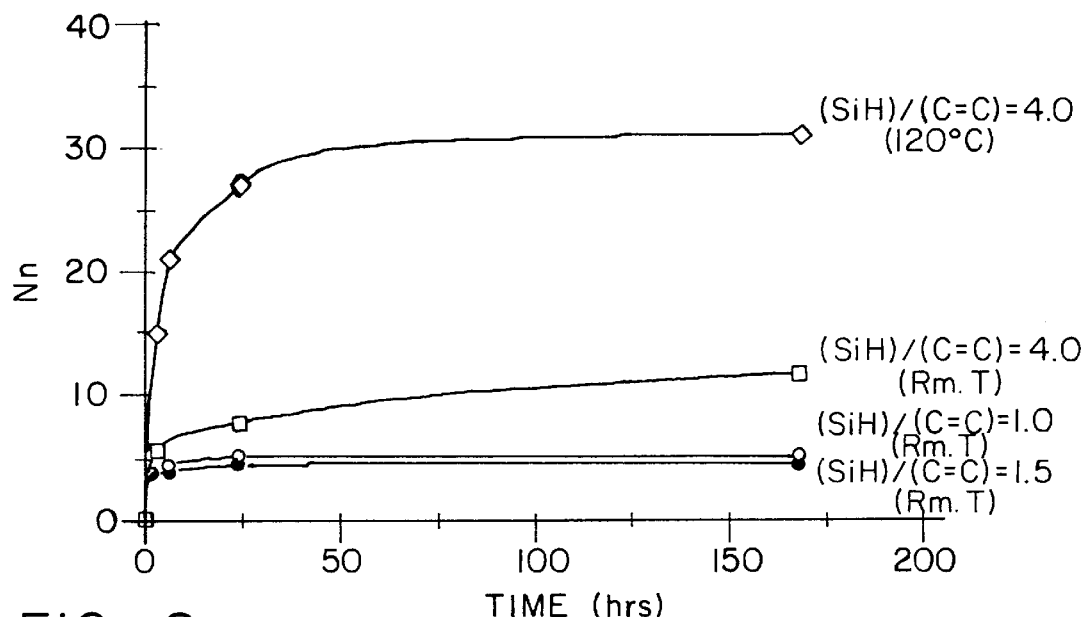
FIG. 8 is a graphical representation of the rate of formation of the number of arms at various [SiH]/C=C] and temperature conditions.

FIG. 8 summarizes the rate of build-up of the number of arms under various experimental conditions. Evidently, higher-order star formation is relatively rapid at 120° C. with product formation virtually complete in one day.

In sum, according to these kinetic data and other information assembled herein, well-defined first-order stars with maximum Nn and narrow dispersity can be prepared with [SiH]/[C=C]=1.25 at room temperature, whereas higher order stars will preferentially arise by the use of [SiH]/[C=C]=4.0 at 120° C. Based upon this information, the synthesis of desirable higher order stars was undertaken.

D. Synthesis of Higher Order Star Polymers

Guided by the results of orienting experiments hereinabove, various star polymers have been synthesized. Table III shows synthesis and characterization data of stars and a comb polymer prepared for comparison purposes. The first column shows the product symbol, columns 2–6 concern synthesis conditions, and columns 7–14 list characterization information.

TABLE III

Synthesis and Characterization of Star Polymers

| Polymer Symbol | Synthesis Conditions | | | | |
|---|---|---|---|---|---|
| | Mn of PIB-(1) g/mol | Siloxane | [SIH]/ [C=C] | Time Days | Temp °C. |
| First Order Star | | | | | |
| 9K-4.4 | 9300 | $D_6^H$ | 1.25 | 10 | r.t. |
| 9K-9.0 | 9300 | $D_{12}^H$ | 1.25 | 10 | r.t. |
| 16K-4.2 | 16200 | $D_6^H$ | 1.25 | 10 | r.t. |
| 16K-8.8 | 16200 | $D_{12}^H$ | 1.25 | 10 | r.t. |
| 33K-4.7 | 35000 | $D_6^H$ | 1.25 | 14 | r.t. |

TABLE III-continued

Synthesis and Characterization of Star Polymers

| Polymer Symbol | Mn of PIB-(1) g/mol | Synthesis Conditions Siloxane | [SIH]/ [C=C] | Time Days | Temp °C. |
|---|---|---|---|---|---|
| Higher-Order Star | | | | | |
| 9K-28 | 9300 | $D_6^H$ | 4.00 | 7 | 120 |
| 16K-21 | 16200 | $D_4^H$ | 4.00 | 14 | 120 |
| 16K-22 | 16200 | $D_6^H$ | 4.00 | 14 | 120 |
| Comb | | | | | |
| 16K-24C | 16200 | $MD_{38}{}^HM$ | 1.81 | 14 | r.t. |

Star Characterization Results

| Polymer Symbol | Star (2) % | Mn(3) g/mol | Mw/ Mn(3) | $N_n$ by LLS | $N_n$ by conv. | $N_n$ by NMR(4) | Methylcyclosiloxane Content Exptl.(4) wt % | Methylcyclosiloxane Content Theor.(5) wt % |
|---|---|---|---|---|---|---|---|---|
| First Order Star | | | | | | | | |
| 9K-4.4 | 92 | 41000 | 1.08 | 4.4 | 4.4 | 4.0 | 0.93 | 0.82 |
| 9K-9.0 | 89 | 84000 | 1.31 | 9.0 | 8.7 | 8.0 | 0.76 | 0.82 |
| 16K-4.2 | 89 | 68000 | 1.08 | 4.2 | 4.3 | — | 0.46 | 0.47 |
| 16K-8.5 | 82 | 144000 | 1.22 | 8.8 | 7.9 | — | 0.46 | 0.47 |
| 33K-4.7 | 80 | 156000 | 1.19 | 4.9 | 3.9 | — | 0.22 | 0.22 |
| Higher-Order Star | | | | | | | | |
| 9K-28 | 94 | 260000 | 4.23 | 28 | | | | 1.48 |
| 16K-21 | 91 | 344000 | 1.39 | 21 | | | | 1.48 |
| 16K-22 | 93 | 350000 | 1.54 | 22 | | | | 1.48 |
| Comb | | | | | | | | |
| 16K-24C | 93 | 394000 | 1.30 | 24 | | | | |

First-order stars made with $D_6H$ exhibit very narrow dispersities ($M_w/M_n$=1.08–1.19), whereas the dispersities of those made with $D_{12}{}^H$ are somewhat broader ($M_w/M_n$= 1.2–1.3) most likely because of the onset of core-core coupling caused by the different conformations of SiH groups. The dispersities of higher order stars tend to be broader ($M_w/M_n$=1.23–1.54) although they are still narrower than stars made by linking of living polyisobutylenes with divinylbenzene (1.6–5.1).

In regard to the number of arms ($N_n$) and cyclosiloxane core content (last five columns in Table III), the agreement between the data obtained by independent methods is quite satisfactory.

Figure 9:
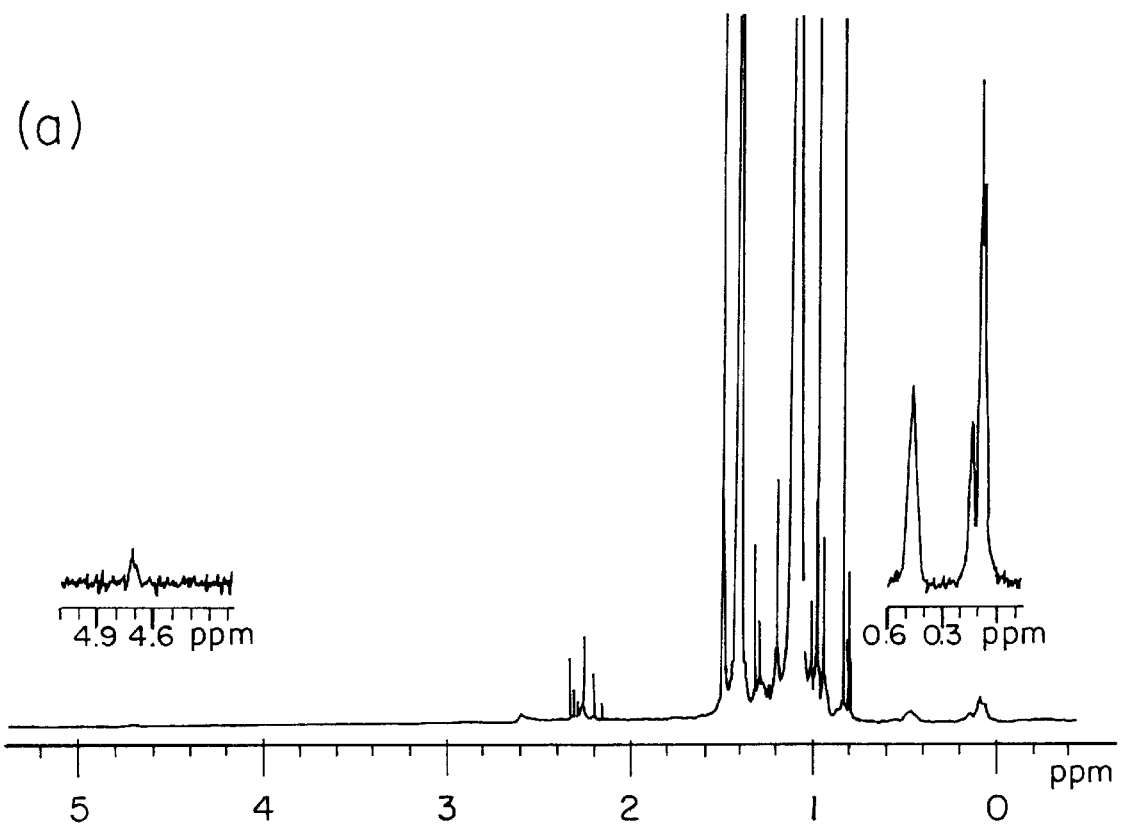
FIG. 9 is a representative $^1$H NMR (600 MHz) spectrum of first order star 9K-4.4 (a) before quenching (SiH present) and (b) after quenching (SiH absent) with 1-pentene.
Figure 9:
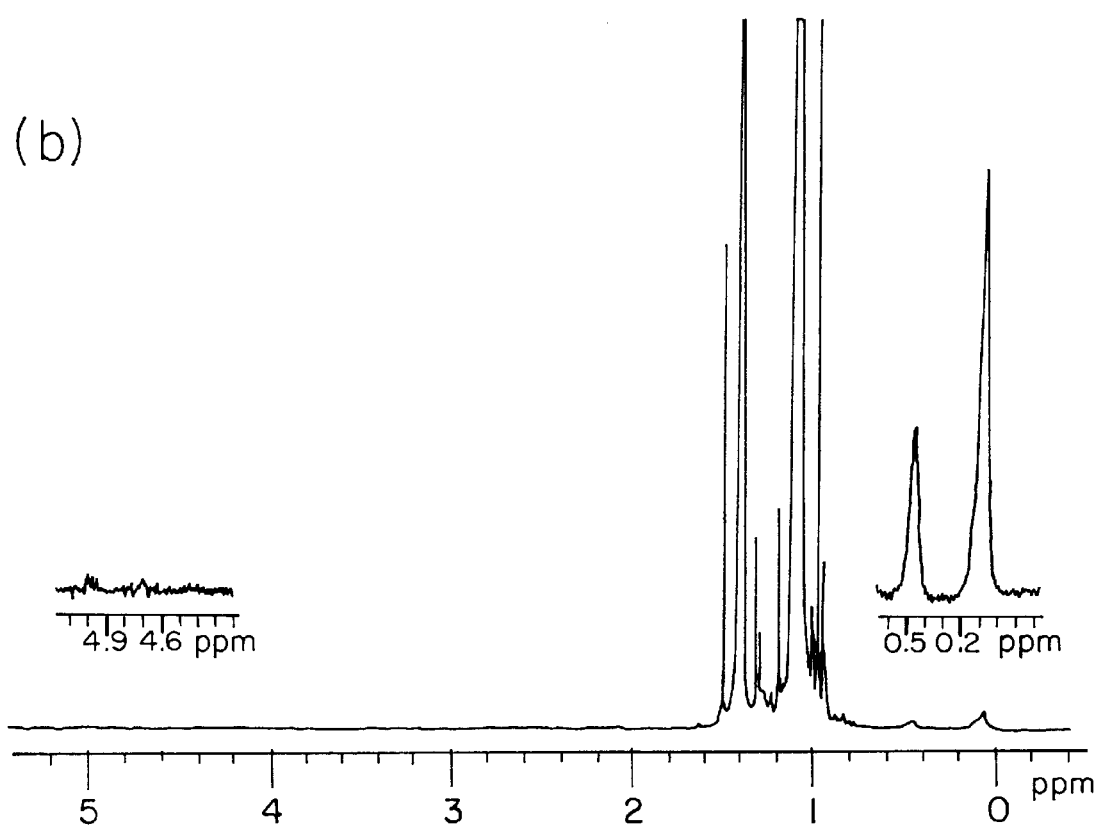

Direct evidence for the presence of star synthesis was obtained by high resolution (600 MHz) $^1$H NMR analysis of unpurified first-order stars. FIG. 9 shows a representative $^1$H NMR spectrum of first order star 9K-4.4 (See Table III) (a) before and (b) after quenching with 1-pentene. Quantitative analysis yielded the following information (normalized to mole of PIB):

| | |
|---|---|
| Si-CH$_3$ | 1.24 mol |
| SiH Consumed | 0.82 mol |
| SiH Remaining | 0.19 mol |
| SiH converted to Si-OH or Si-O-Si | 0.22 mol |

Theoretical $N_n$ values are reasonably close to those obtained by NMR spectroscopy (see first two rows in Table III). Furthermore, these values are in reasonable agreement with those obtained by GPC(LLS) and calculated from % conversions. The amount of Si—O—Si units is very low. The amounts of Si—OH and SiH groups was expected to be similar. The "survival" of Si—OH groups in air (presence of moisture) is most likely due to the protection of the PIB corona. The molecular weight of star 9K-9.0 did not change after four months of exposure to laboratory air (i.e., absence of core-core coupling).

The $N_n$ values obtained by $^1$H NMR spectroscopy (Table III) are consistently lower than those obtained from GPC (LLS) and conversions which may be due to minor core-core coupling.

Figure 10:
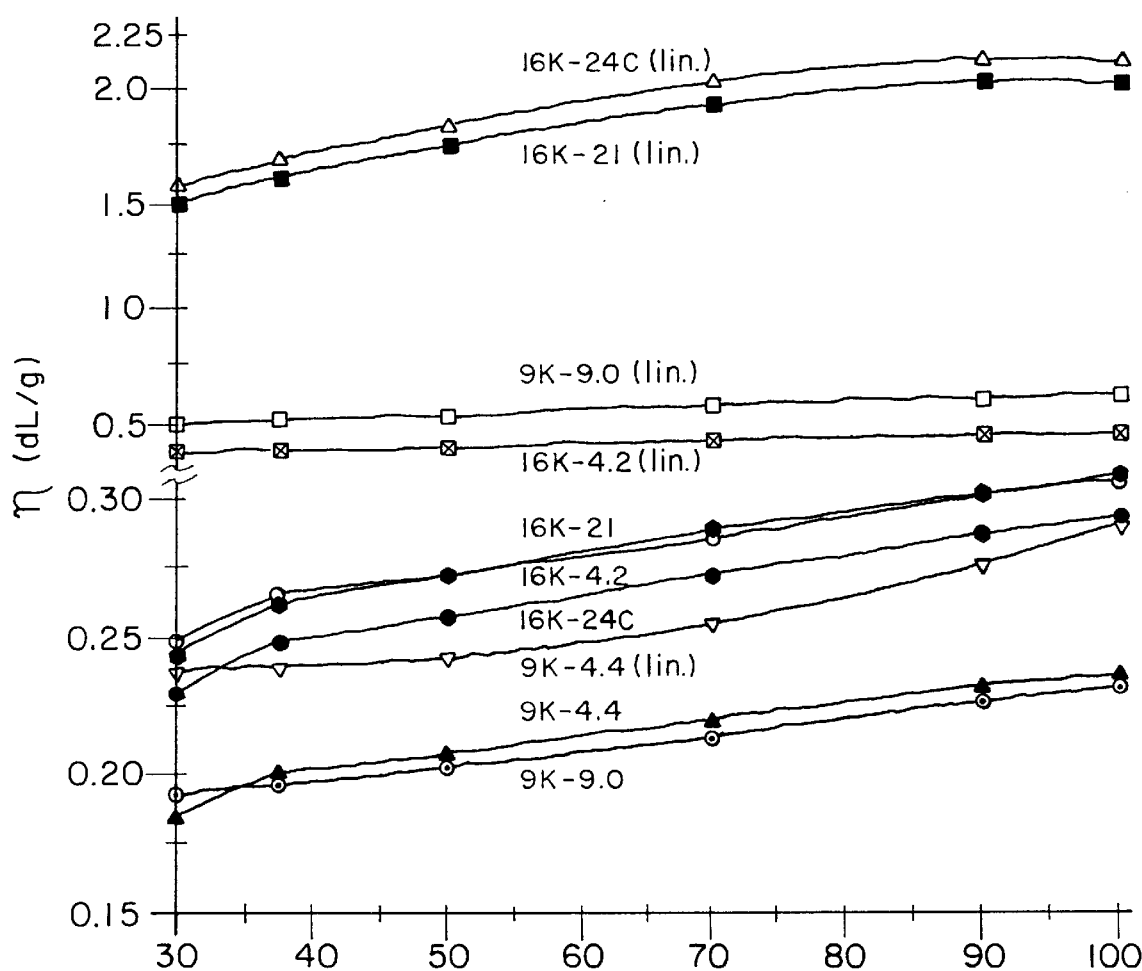
FIG. 10 is a graphical representation of the intrinsic viscosity as a function of temperature of various comb (linear) star polymers (including 16K-24C).

Since star polymers are of great interest as rheology control agents, we have investigated dilute solution viscosities of select stars. FIG. 10 shows intrinsic viscosities of various star polymers together with those of linear PIBs (calculated values) in toluene as a function of temperature. Evidently, the intrinsic viscosity of stars is much lower than those of the linear counterparts, and is mainly determined by the molecular weight of the arms and much less by the number or arms. Similar observations have been discussed in detail elsewhere.

FIG. 10 also shows, for comparative purposes, the intrinsic viscosity/temperature profile of a comb polymer. This structure 16K-24C (see last row of Table III) was assembled by hydrosilating PIB—CC=C prearms ($M_n$=16,200 g/mol) with $MD_{38}{}^HM$. Interestingly, the intrinsic viscosity of this comb polymer is very close to those of stars with similar arm molecular weights. This suggests that the hydrodynamic volume of this comb and those of the stars are similar. We postulate that because of the incompatibility of the linear siloxane backbone and PIB arms, the relatively small backbone is forced into a tight central coil and the structure assumes a radial shape similar to that of a star.

Figure 11:
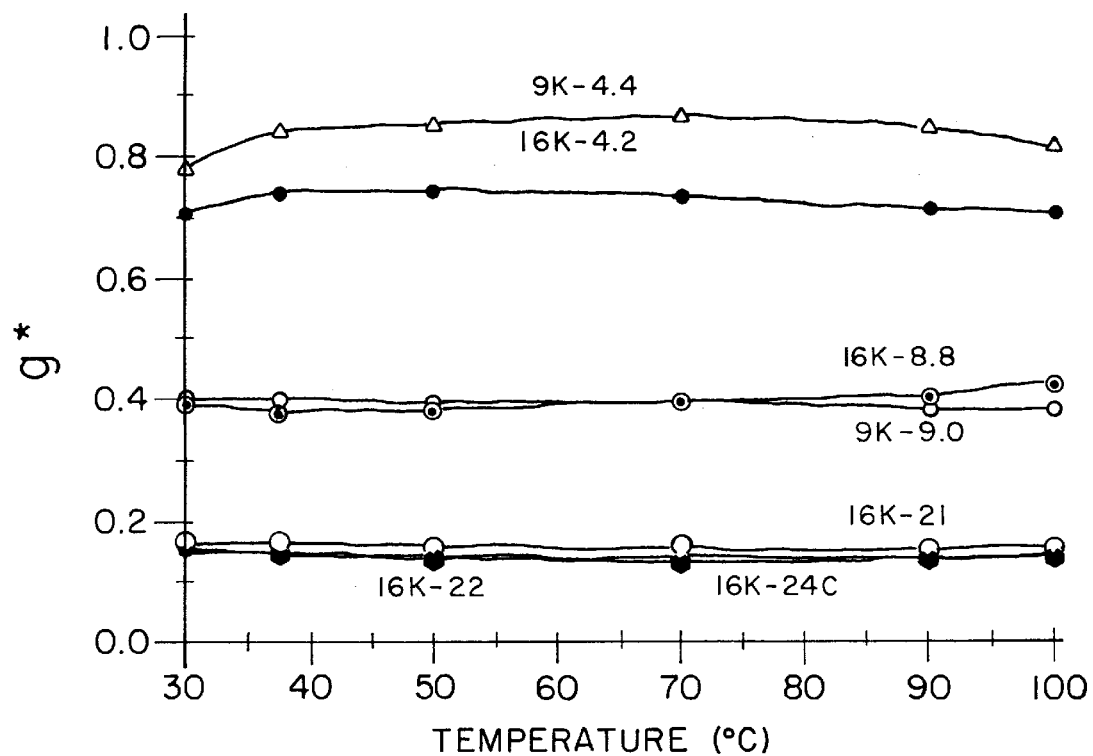
FIG. 11 is a graphical representation showing g* as a function of temperature for the structures listed in Table III.

From intrinsic viscosity data we have calculated branching coefficients g*, and FIG. 11 shows g* as a function of temperature for the structures listed in Table III. In accord with the conclusions above, the g* of the 16K-24C comb is virtually identical to those of two stars of similar arm molecular weight.

Figure 12:
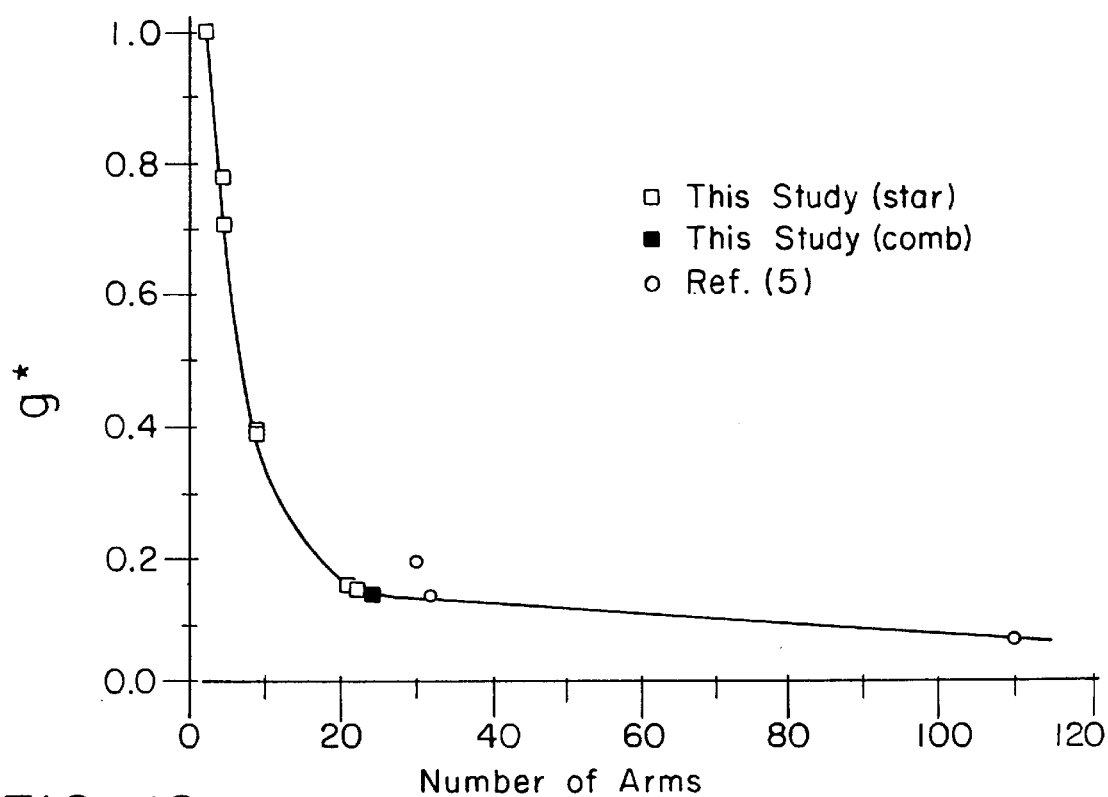
FIG. 12 is a is a graphical representation showing g* as a function of the number of arms, $N_n$, of stars prepared herein.

FIG. 12 shows g* as a function of $N_n$ of stars prepared in this work together with those prepared by linking living polyisobutylenes with dinvinylbenzene. Significantly, all the data can be plotted on a common line which is strong evidence that all these structures are radial. This conclusion is of significance for the present invention, and the facts in FIG. 12 indicate that the higher order stars are also composed of coronas of multiple PIB arms emanating from a condensed core.

Common cyclosiloxanes are known to be quite vulnerable to acid or base hydrolysis. In view of the possible uses of our novel stars (e.g., rheology controlling additives in motor ails exposed to harsh environments), it was of interest to test their resistance towards strong acid and bases. Table IV shows the results of experiments. $D_5$ was included as a control to mimic the hydrolytic behavior of a structure similar to the cores of stars.

TABLE IV

Acid and Base Resistance of Star Polymers[1]

| | Time (in days) | | | | |
|---|---|---|---|---|---|
| Acid | 0 | 3 | 7 | 14 | 21 |
| D5 (Blank) 50% $H_2SO_4$, no solvent | | | | | |
| Amount of $D_5$ degraded (%) | 0 | −30 | −44 | | −85 |
| 16K-4.2 50% $H_2SO_4$, no solvent | | | | | |
| Mn × 10³ | 68 | 67 | 63 | | 67 |
| Decrease in the amount of Star (%) | 0 | −3 | −5 | | −5 |
| 9K-9.0 50% $H_2SO_4$, no solvent | | | | | |
| Mn × 10³ | 84 | 82 | 83 | | 81 |
| Decrease in the amount of Star (%) | 0 | −1 | −3 | | −1 |
| $D_5$ (Blank) Conc. $H_2SO_4$, Toluene | | | | | |
| Amount of $D_5$ degraded (%) | 0 | −100 | | | |
| 16K-4.2 Conc: $H_2SO_4$, Xylene | | | | | |
| Mn × 10³ | 68 | 58 | 58 | 56 | |
| Decrease in the amount of Star (%) | 0 | −5 | −6 | −5 | |
| 9K-9.0 Conc. $H_2SO_4$ Xylene | | | | | |
| Mn × 10³ | 84 | 36 | 32 | 30 | |
| Decrease in the amount of Star (%) | 0 | −1 | −2 | −3 | |
| | Time (in days) | | | | |
| Base | 0 | 1 | 3 | 7 | 14 |
| $D_5$ (Blank) t-BuOK, Toluene, | | | | | |
| Amount of $D_5$ degraded (%) [2] | 0 | −88 | | | |
| 16K-4.4 t-BuOK, Xylene, 70° C. | | | | | |
| Mn × 10³ | 68 | 55 | 55 | 46 | 47 |
| Decrease in the amount of Star (%) | 0 | −10 | −11 | −11 | −22 |
| 9K-4.4 t-BuOK, Xylene, 70° C. | | | | | |
| Mn × 10³ | 84 | 37 | 35 | 31 | 30 |
| Decrease in the amount of Star (%) | 0 | −7 | −7 | −8 | −13 |
| 9K-4.4 t-BuOK, THF and MeOH | | | | | |
| Mn × 10³ (not determined) | | | | | |
| Decrease in the amount of Star (%) | 0 | | | −75 | −79 |

[1] At 70° C.
[2] By GC

According to the results shown in Table IV, 50% $H_2SO_4$ had practically no effect on representative stars in bulk after heating to 70° C. for 3 weeks. Similar results have also been obtained by the use of p-toluene sulfonic acid with hexamethyldisiloxane ($M_2$). Evidently the acid-resistant PIB corona completely envelops and thus protects the acid-vulnerable core. It was theorized that by repeating the experiment in the presence of an acid-resistant solvent (i.e., xylene) that would loosen up protective corona (e.g., xylene), contact with concentrated $H_2SO_4$ would be facilitated and degradative hydrolysis would proceed. Indeed, this is what happened and degradation occurred with star 9K-9.0 having relatively shore PIB arms (i.e., smaller corona). Interestingly, however, after the Mn decreased from 84,000 to 36,000 g/mol, the degradation practically stopped. It is believed that incomplete hydrolysis transformed the relatively large cores to smaller cores, and that the smaller cores were protected by the intact PIB arms from further acid attack. Indeed, star 16K-4.2 with the longer PIB arms even under these more forcing conditions degraded only to a limited extent.

Similar tests were also carried out with t-BuOK to test the base resistance of stars. According to the results, $D_5$ rapidly degraded even at room temperature, whereas the stars, depending on the time and temperature, underwent various extents of lesser degradations. Under more aggressive conditions in the presence of alcohol, stars were completely decomposed.

Table V shows thermal stability information of star polymers and various controls in terms of decomposition temperatures at various extents of weight loss.

TABLE V

Thermal Stability by TGA

| | Temperatures (°C.) Weight loss (%) | | | |
|---|---|---|---|---|
| Polymers | −5 | −10 | −20 | −30 |
| Linear-PIBs | | | | |
| PIB Mn = 3720 | 267 | 292 | 316 | 328 |
| PIB Mn = 9300 | 257 | 275 | 293 | 307 |
| PIB Mn-145000 | 273 | 285 | 297 | 306 |
| Silicones | | | | |
| KF-96 100CS[1] | 331 | 340 | 353 | 364 |
| $M^HD80M^H$[2] | 306 | 324 | 344 | 365 |
| First Order Stars | | | | |
| 9K-4.4 | 270 | 282 | 298 | 309 |
| 9K-9.0 | 257 | 270 | 286 | 296 |
| 16K-4.2 | 278 | 296 | 313 | 325 |
| 16K-8.8 | 275 | 290 | 309 | 318 |
| 33K-4.7 | 280 | 292 | 307 | 315 |
| Higher-Order Star | | | | |
| 16K-22 | 262 | 276 | 295 | 306 |

[1] Dimethylpolysiloxane (Shin-Etsu Chemical Co., Ltd.)
[2] α,ω-dihidro-dimethylsiloxane (Degree of polymerization: 80)

According to this data the thermal stability of the stars reflect those of the PIB arms. This finding is not surprising in view of the large preponderance of the PIB moiety in the stars and the superior heat resistance of polysiloxanes.

Thus, the simple and inexpensive synthesis of star polymers consisting of a corona of PIB arms connected to and enveloping a methylcyclosioxane core has been demonstrated. The arms arise of well-defined narrow dispersity allyl-terminated PIB. The core can be obtained either from a simple cyclosiloxane ($D_4^H$, $D_6^H$ or $D_{12}^H$ have been used) in which case so called first-order or primary stars will be formed, or by the condensation of first-order stars to higher-order stars, as outlined in Scheme 1. The competitive processes can be controlled by the judicious choice of experimental conditions and first-order or higher-order stars can be prepared. The latter product/process is of particular significance for the rapid and convenient synthesis of multi-arm stars. The synthesis of 21–28 arm stars have been described. the stars have been characterized by a variety of techniques, and the kinetics of star formation was analyzed.

The intrinsic viscosities and branching coefficients g* of stars and a comb polymer of similar composition in the 30°–100° C. range were studied. The intrinsic viscosities of stars are much lower than those of linear PIB arms of the same molecular weight. The g* of stars depend on the number of arms and not on the molecular weight of arms. The hydrodynamic volume of star and comb polymers of similar composition are virtually identical, suggesting that the combs also assume radial conformations in dilute solution. The g* as a function of the number of arms of stars prepared in this study and those made by linking living PIB carbocations by dinvinylbenzene follow the same pattern indicating the formation of fundamentally similar structures by both techniques. Stars are much more resistant to conc. $H_2SO_4$ and t-BuOK than the naked core suggesting that the PIB corona envelops and thus protects the cores from the attack of these aggressive chemicals. The overall heat resistance of the stars were found to be similar to that of PIB.

It should thus be evident that the methods of the present invention are highly effective in synthesizing higher order star-shaped polyisobutylenes with condensed cyclosiloxane cores. The invention is particularly suited for higher order stars having many PIB arms, but is not necessarily limited thereto. Even more particularly, it has been demonstrated that multiple olefin-capped (e.g., allyl- or isopropenyl-terminated) PIB arms may be linked to multifunctional hydrogencyclosiloxanes via hydrosilation and that, in the presence of moisture, core-core coupling can be made to occur such that higher order (i.e., stars having four or more core couplings) stars are formed. Such multi-arm star polymers are seen as having utility as motor oil additives and the like, although it will be appreciated that the subject star polymers may be readily useful in a variety of applications, including the manufacture of other materials as well. While it was known that, in the presence of adventitious trace of water in the synthesis charge, a parasitic reaction might occur which gave rise to higher order star polymers by star-star coupling, it has now been shown that this reaction can be controlled.

Based upon the foregoing disclosure, it should now be apparent that the novel star polymers described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, cyclosiloxanes according to the present invention are not necessarily limited to the methyl-cyclosiloxanes employed herein. Moreover, the polyisobutylene arms of the present invention may be prepared based upon a variety of methods. Thus, the scope of the invention shall include all modifications and variations that may fall within the scope of the attached claims.

What is claimed is:

1. A star polymer comprising:
    a core component containing at least three condensed siloxanes, at least one of said siloxanes having at least two Si—H groups prior to condensation and at least one other of said siloxanes having at least one Si—OH group prior to condensation; and
    a plurality of polyisobutylene arms attached to said core component;
    wherein the total number of arms attached to said core component is greater than the total number of Si—H groups present on any one siloxane prior to condensation.

2. The star polymer of claim 1, wherein said siloxanes are cyclosiloxanes.

3. The star polymer of claim 2, wherein said cyclosiloxanes are selected from the group consisting of alkyl-cyclosiloxanes and phenyl-cyclosiloxanes.

4. The star polymer of claim 2, wherein said cyclosiloxanes are methyl-cyclosiloxanes.

5. The star polymer of claim 4, wherein said methylcyclosiloxanes contain at least 3 Si—H groups prior to condensation.

6. The star polymer of claim 4, wherein said methylcyclosiloxanes contain from 4 to 12 Si—H groups prior to condensation.

7. The star polymer of claim 4, wherein said methylcyclosiloxanes contain from 4 to 8 Si—H groups prior to condensation.

8. The star polymer of claim 1, wherein said siloxanes are linear siloxanes which assume tight coil configurations upon being attached to said polyisobutylene arms.

9. A method for synthesizing a star polymer containing a core of at least two condensed siloxanes and a plurality of polyisobutylene arms emanating from said core, the method comprising:
    linking, by hydrosilation, olefin-terminated polyisobutylene prearms to at least one of said siloxanes; and
    coupling said siloxanes to form the core by providing an effective amount of water to produce at least one Si—OH group within at least one of said siloxanes and reacting said at least one Si—OH group with one of an Si—H group or another Si—OH group of at least one other siloxane.

10. The method of claim 9 wherein said siloxanes are selected from the group consisting of cyclosiloxanes.

11. The method of claim 10, wherein said cyclosiloxanes are selected from the group consisting of alkyl-cyclosiloxanes and phenyl-cyclosiloxanes.

12. The method of claim 11, wherein said cyclosiloxanes are methylcyclosiloxanes.

13. The method of claim 9 wherein said core includes at least two siloxanes having at least two Si—H groups prior to hydrosilation and at least one Si—H group after hydrosilation.

14. The method of claim 9 wherein said olefin-terminated polyisobutylene prearms are selected from the group consisting of allyl-terminated polyisobutylenes and isopropenyl-terminated polyisobutylenes.

15. A method for synthesizing a star polymer containing a core of at least two condensed siloxanes and a plurality of polyisobutylene arms emanating from said core, the method comprising:
    linking, by hydrosilation, olefin-terminated polyisobutylene prearms to at least one of said siloxanes, said at least one siloxane having at least two Si—H groups prior to hydrosilation and at least one Si—H group after hydrosilation; and
    coupling said siloxanes to form a core by providing an effective amount of water to convert a fraction of the Si—H groups of said siloxanes to Si—OH groups and reacting said Si—OH groups with one of said Si—H groups or said Si—OH groups of at least one other siloxane.

16. The method of claim 15 wherein water is provided in an amount, in moles, less than the amount, in moles, of Si—H groups present in said siloxanes prior to hydrosilation.

* * * * *